United States Patent
Sano

(10) Patent No.: US 9,234,795 B2
(45) Date of Patent: Jan. 12, 2016

(54) SPECTROSCOPIC MEASUREMENT APPARATUS CAPABLE OF QUICKLY MEASURING A SPECTRAL CHARACTERISTIC

(71) Applicant: Seiko Epson Corporation, Tokyo (JP)

(72) Inventor: Akira Sano, Shiojiri (JP)

(73) Assignee: Seiko Epson Corporation (JP)

( * ) Notice: Subject to any disclaimer, the term of this patent is extended or adjusted under 35 U.S.C. 154(b) by 10 days.

(21) Appl. No.: 13/658,118

(22) Filed: Oct. 23, 2012

(65) Prior Publication Data
US 2013/0114083 A1 May 9, 2013

(30) Foreign Application Priority Data

Nov. 9, 2011 (JP) .................. 2011-245517

(51) Int. Cl.
G01J 3/51 (2006.01)
G01J 3/02 (2006.01)
G02B 26/00 (2006.01)
G01J 3/10 (2006.01)
G01J 3/26 (2006.01)
G01J 3/32 (2006.01)
(Continued)

(52) U.S. Cl.
CPC .............. *G01J 3/0297* (2013.01); *G01J 3/027* (2013.01); *G01J 3/10* (2013.01); *G01J 3/26* (2013.01); *G01J 3/32* (2013.01); *G01J 3/42* (2013.01); *G02B 26/001* (2013.01); *G01J 2003/2879* (2013.01)

(58) Field of Classification Search
CPC ...... G02B 5/284; G02B 5/28; G02B 6/29358; G02B 6/29361; G02B 6/29395; G01B 2290/25; G01J 3/26; G01J 3/51; G01J 3/46
USPC .......... 356/416, 454, 480, 508, 519; 702/180, 702/181, 1–84
See application file for complete search history.

(56) References Cited

U.S. PATENT DOCUMENTS 6,538,748 B1    3/2003  Tucker et al.
7,106,514 B2 *  9/2006  Murata et al. ................ 359/578
(Continued)

FOREIGN PATENT DOCUMENTS

JP    07-243963    9/1995
JP    2002-006238  1/2002
(Continued)

*Primary Examiner* — Michael A Lyons
*Assistant Examiner* — Violeta A Prieto
(74) *Attorney, Agent, or Firm* — Harness, Dickey & Pierce, P.L.C.

(57) ABSTRACT

A spectroscopic measurement apparatus includes: a wavelength tunable interference filter including a fixed substrate having a fixed reflection film, a movable substrate having a movable reflection film, and an electrostatic actuator that changes a gap value of an inter-reflection-film gap by applying a voltage to bend the movable substrate; a detector that detects a light level; and a controller that measures a spectral characteristic of light under measurement. The controller includes a filter driver that applies a drive voltage to the electrostatic actuator to change the inter-reflection-film gap, a detected light level acquisition unit that acquires light levels detected by the detector, and a target light level acquisition unit that acquires a light level corresponding to an oscillation center of the movable substrate as a target light level based on how the detected light level transitions and a natural oscillation cycle that the movable substrate has.

9 Claims, 27 Drawing Sheets

(51) Int. Cl.
 *G01J 3/42* (2006.01)
 *G02B 5/28* (2006.01)
 *G01J 3/28* (2006.01)

(56) References Cited

U.S. PATENT DOCUMENTS

| | | | |
|---|---|---|---|
| 7,187,453 B2* | 3/2007 | Belleville | 356/504 |
| 7,286,244 B2* | 10/2007 | Murata | 356/519 |
| 8,462,348 B2* | 6/2013 | Shinto et al. | 356/454 |
| 8,512,492 B2* | 8/2013 | Yamazaki | 156/109 |
| 8,512,493 B2* | 8/2013 | Yamazaki | 156/109 |
| 8,559,111 B2* | 10/2013 | Nishimura et al. | 359/578 |
| 8,848,196 B2* | 9/2014 | Nishimura et al. | 356/454 |
| 2002/0050560 A1* | 5/2002 | Kabuki et al. | 250/226 |
| 2005/0122191 A1* | 6/2005 | Nakamura et al. | 333/202 |
| 2011/0176128 A1* | 7/2011 | Matsuno | 356/72 |
| 2011/0194118 A1* | 8/2011 | Hirokubo et al. | 356/454 |
| 2011/0205551 A1* | 8/2011 | Saito et al. | 356/519 |
| 2011/0222158 A1* | 9/2011 | Sano | 359/584 |
| 2011/0228397 A1* | 9/2011 | Matsushita | 359/578 |
| 2012/0019812 A1* | 1/2012 | Shinto et al. | 356/213 |
| 2012/0019827 A1* | 1/2012 | Shinto et al. | 356/416 |
| 2012/0044491 A1* | 2/2012 | Urushidani et al. | 356/326 |
| 2012/0050742 A1* | 3/2012 | Sano | 356/416 |
| 2012/0086945 A1* | 4/2012 | Hirokubo et al. | 356/450 |
| 2012/0109584 A1* | 5/2012 | Urushidani | 702/189 |
| 2012/0120402 A1* | 5/2012 | Hirokubo et al. | 356/450 |
| 2012/0188552 A1* | 7/2012 | Hirokubo | 356/451 |
| 2012/0257205 A1* | 10/2012 | Hirokubo | 356/450 |
| 2013/0070247 A1* | 3/2013 | Funamoto | 356/416 |
| 2013/0107262 A1 | 5/2013 | Nishimura et al. | |
| 2013/0279005 A1* | 10/2013 | Sano | 359/578 |
| 2014/0009761 A1* | 1/2014 | Nishimura | 356/402 |

FOREIGN PATENT DOCUMENTS

| | | | | |
|---|---|---|---|---|
| JP | 2002-071562 | | 3/2002 | |
| JP | 2003-254834 | | 9/2003 | |
| JP | 2003254834 A | * | 9/2003 | G01J 9/00 |

* cited by examiner

SPECTROSCOPIC MEASUREMENT APPARATUS CAPABLE OF QUICKLY MEASURING A SPECTRAL CHARACTERISTIC

BACKGROUND

1. Technical Field

The present invention relates to a spectroscopic measurement apparatus.

2. Related Art

There has been a known wavelength tunable interference filter that includes a pair of reflection films facing each other and picks up light of a predetermined wavelength from light under measurement by changing the distance between the reflection films (see JP-A-7-243963, for example).

The optical resonator (wavelength tunable interference filter) described in JP-A-7-243963 includes a first substrate having a recess formed in a surface thereof and a second substrate that blocks the recess, and the second substrate is so bonded to the first substrate that the interior of the recess is blocked. Further, high reflection films facing each other and electrodes that adjust the gap between the reflection films (inter-reflection-film gap) are provided on the bottom of the recess of the first substrate and the surface of the second substrate that faces the recess. The second substrate has a thick portion and a thin portion in an area facing the recess, and the thick portion can move toward and away from the recess when the thin portion is bent.

In the thus configured wavelength tunable interference filter, the inter-reflection-film gap can be adjusted by applying a voltage between the electrodes to deform the thin portion of the diaphragm and move the thick portion toward and away from the glass substrate.

To pick up light of a target wavelength through the wavelength tunable interference filter described above, a voltage according to the target wavelength is applied between the electrodes. At this point, since an electrostatic attractive force induced by the voltage application and an elastic force produced by the thin portion of the second substrate act on the thick portion of the second substrate, the thick portion oscillates.

In view of the fact described above, to measure light of the target wavelength in a precise manner, a spectroscopic measurement apparatus of related art using a wavelength tunable interference filter of this type waits until the thick portion stops oscillating and becomes stationary and then performs light level measurement after the thick portion stops oscillating and becomes stationary. The spectroscopic measurement apparatus of related art therefore has a problem of a long measurement period.

SUMMARY

An advantage of some aspects of the invention is to provide a spectroscopic measurement apparatus capable of quickly measuring a spectral characteristic.

A spectroscopic measurement apparatus according to an aspect of the invention includes: a wavelength tunable interference filter including a first substrate, a second substrate disposed to face the first substrate, a first reflection film provided above the first substrate, a second reflection film provided above the second substrate and disposed to face the first reflection film with an inter-reflection-film gap interposed therebetween, and a gap value changer that changes a gap value of the inter-reflection-film gap by applying a voltage to bend the second substrate toward the first substrate; a detection unit that detects a light level of light picked up by the wavelength tunable interference filter; and a measurement controller including a filter driver that applies a drive voltage to the gap value changer to change the inter-reflection-film gap, a detected light level acquisition unit that acquires light levels detected by the detection unit during a period from a first timing after the filter driver applies the drive voltage to a predetermined second timing, and a target light level acquisition unit that acquires a light level corresponding to an oscillation center of the second substrate as a target light level based on how the detected light level transitions and a natural oscillation cycle that the second substrate has.

In the aspect of the invention, the detection unit that detects light passing through the wavelength tunable interference filter and the measurement controller that measures a light level of light of a target wavelength (target light level) based on light levels detected by the detection unit are provided. The measurement controller includes the filter driver, the detected light level acquisition unit, and the target light level acquisition unit.

In the thus configured spectroscopic measurement apparatus, when the filter driver applies a drive voltage to the gap value changer in the wavelength tunable interference filter, the second substrate in the wavelength tunable interference filter is bent toward the first substrate and the gap value of the inter-reflection-film gap changes. At this point, stress produced by the gap value changer and an elastic force produced by the second substrate act on the second substrate, which oscillates at a predetermined natural oscillation cycle. The amplitude of the oscillation decreases with time and eventually becomes zero, which allows light of a target wavelength to be picked up through the wavelength tunable interference filter. Measuring a light level of light of a target wavelength (target light level) after waiting until the oscillation stops is problematic in that it takes long to make the measurement as described above. In contrast, in the aspect of the invention, the detected light level acquisition unit acquires light levels detected by the detection unit during a period from the first timing to the second timing, during which the second substrate oscillates. The detected light level acquisition unit then acquires a light level corresponding to the oscillation center of the second substrate based on how the detected light level transitions and the natural oscillation cycle that the second substrate itself has. The oscillation center of the second substrate is a position where the second substrate is stationary when the oscillation of the second substrate stops and a position where the wavelength tunable interference filter picks up light of a target wavelength. In the aspect of the invention, it is therefore not necessary to wait until the oscillation of the second substrate stops, but a target light level corresponding to the oscillation center of the second substrate can be quickly acquired. The spectroscopic measurement apparatus can therefore also quickly measure a spectral characteristic of the light under measurement.

In the spectroscopic measurement apparatus according to the aspect of the invention, it is preferable that the target light level acquisition unit acquires the following light levels from the light levels acquired by the detected light level acquisition unit: a maximum light level; a minimum light level; a first light level at a point of time one-fourth the natural oscillation cycle before a maximum detection timing when the maximum light level is detected; a second light level at a point of time one-fourth the natural oscillation cycle after the maximum detection timing when the maximum light level is detected; a third light level at a point of time one-fourth the natural oscillation cycle before a minimum detection timing when the minimum light level is detected; and a fourth light level at a point of time one-fourth the natural oscillation cycle after the minimum detection timing when the minimum light level is detected, and the target light level acquisition unit acquires the target light level based on whether the first light level, the second light level, the third light level, and the fourth light level agree with each other.

The term "agree with" used herein includes agreement with a narrow error and includes a case where light levels do not completely agree with each other but substantially agree with each other.

According to the aspect of the invention described above, a maximum light level, a minimum light level, a first light level, a second light level, a third light level, and a fourth light level are acquired from the light levels acquired by the detected light level acquisition unit, and it is determined whether or not the first to fourth light levels agree with each other. A target light level is thus acquired.

The oscillation of the second substrate that occurs when a drive voltage is applied to the gap value changer in the wavelength tunable interference filter is a very narrow range oscillation, and a plurality of peak light levels and bottom light levels are unlikely to be present within the narrow range. In view of the fact, when the gap value of the inter-reflection-film gap is maximized or minimized during the oscillation of the second substrate, the detection unit detects a maximum light level or a minimum light level in many cases. In the detection pattern described above, the oscillation center of the second substrate can be readily detected by setting the timing when a maximum light level or a minimum light level is detected as an oscillation end point of the second substrate, whereby a target light level corresponding to the oscillation center can be detected.

It is also conceivable to provide a target light level corresponding to the oscillation center by acquiring light levels at constant intervals during the oscillation of the second substrate and averaging the thus acquired light levels. When a target light level is provided as the average described above, however, the average is not always a light level corresponding to the oscillation center. In this case, a large measurement error and other problems occur. In contrast, in the aspect of the invention described above, in which a light level corresponding to the oscillation center is detected based on first to fourth light levels, the measurement error can be suppressed and the measurement precision can be improved.

In the spectroscopic measurement apparatus according to the aspect of the invention described above, it is preferable that, when the first light level, the second light level, the third light level, and the fourth light level are equal to each other, the target light level acquisition unit acquires any of the light levels as the target light level.

The term "equal to each other" used herein includes a value with a slight error that does not greatly affect measurement results and does not necessarily mean the exact same value, as in the case of the term "agree with" described above. The same holds true for the other aspects of the invention described below.

In the aspect of the invention described above, when a first light level, a second light level, a third light level, and a fourth light level are equal to each other, the target light level acquisition unit uses any of the light levels as the target light level.

The state in which a first light level, a second light level, a third light level, and a fourth light level are equal to each other means that the detection unit detects a maximum light level or a minimum light level when the gap value of the inter-reflection-film gap is maximized or minimized, that is, at an oscillation end point of the second substrate. In this case, since the oscillation center of the second substrate corresponds to a point of time one-fourth the natural oscillation cycle of the second substrate after or one-fourth the natural oscillation cycle of the second substrate before a point of time when the second substrate is positioned at an oscillation end point, each of the first light level, the second light level, the third light level, and the fourth light level is a target light level corresponding to the oscillation center. The target light level acquisition unit can therefore quickly acquire the target light level by acquiring the first to fourth light levels as the target light level when the light levels described above are equal to each other.

In the aspect of the invention described above, it is preferable that, when the first light level and the second light level are equal to each other and the third light level and the fourth light level differ from each other, the target light level acquisition unit acquires the first light level and the second light level as the target light level.

When a first light level and a second light level are equal to each other and a third light level and a fourth light level differ from each other as described above, the light level corresponding to one of the oscillation end points of the second substrate is a maximum light level, and a bottom wavelength is present within the wavelength range under measurement corresponding to the inter-reflection-film gap changing range. It is then determined that the light level at the bottom wavelength is detected as a minimum light level.

In this case, since the oscillation center of the second substrate corresponds to a point of time one-fourth the natural oscillation cycle of the second substrate after or one-fourth the natural oscillation cycle of the second substrate before the point of time when a maximum light level is detected, the first light level and the second light level are the target light level corresponding to the oscillation center.

Therefore, when a first light level and a second light level are equal to each other and a third light level and a fourth light level differ from each other, the target light level acquisition unit can quickly acquire a target light level by acquiring the first and second light levels as the target light level, and the spectroscopic measurement apparatus can also perform quick spectroscopic measurement.

In the spectroscopic measurement apparatus according to the aspect of the invention described above, it is preferable that, when the first light level and the second light level differ from each other and the third light level and the fourth light level are equal to each other, the target light level acquisition unit acquires the third light level and the fourth light level as the target light level.

When a first light level and a second light level differ from each other and a third light level and a fourth light level are equal to each other as described above, the light level corresponding to one of the oscillation endpoints of the second substrate is a minimum light level, and a peak wavelength is present within the wavelength range under measurement corresponding to the inter-reflection-film gap changing range. It is then determined that the light level at the peak wavelength is detected as the maximum light level.

In this case, since the oscillation center of the second substrate corresponds to a point of time one-fourth the natural oscillation cycle of the second substrate after or one-fourth the natural oscillation cycle of the second substrate before the point of time when a minimum light level is detected, the third light level and the fourth light level are the target light level corresponding to the oscillation center.

In the aspect of the invention described above, when a first light level and a second light level differ from each other and a third light level and a fourth light level are equal to each other, the target light level acquisition unit can quickly acquire a target light level by acquiring the third and fourth light levels as the target light level.

In the spectroscopic measurement apparatus according to the aspect of the invention described above, it is preferable that, when the first light level and the second light level are equal to each other, the third light level and the fourth light level are equal to each other, and the first light level and the third light level differ from each other, the filter driver slightly changes the drive voltage applied to the gap value changer, and after the filter driver slightly changes the drive voltage applied to the gap value changer, the target light level acquisition unit acquires the target light level corresponding to the drive voltage after the voltage is changed based on a first light level, a second light level, a third light level, and a fourth light level newly acquired by the detected light level acquisition unit.

In the detection pattern described above, the light level corresponding to an oscillation end point of the second substrate is a maximum light level or a minimum light level, and a peak wavelength or a bottom wavelength is present at the oscillation center of the second substrate. In this case, it is difficult to determine whether a peak wavelength or a bottom wavelength is present at the oscillation center based only on how the light level transitions.

In contrast, in the aspect of the invention described above, when a first light level and a second light level are equal to each other, a third light level and a fourth light level are equal to each other, and the first light level (second light level) and the third light level (fourth light level) differ from each other, the filter driver slightly changes the voltage applied to the gap value changer, which changes the oscillation center of the second substrate and hence changes a maximum light level, a minimum light level, and the timings at which the maximum light level and the minimum light level are acquired. The target light level acquisition unit then acquires a target light level corresponding to the drive voltage after the voltage is changed. A method for acquiring the target light level in this process can be the same method as that described above. That is, when first to fourth light levels are equal to each other, the target light level acquisition unit acquires the first to fourth light levels as the target light level. When a first light level and a second light level are equal to each other and a third light level and a fourth light level differ from each other, the first light level and the second light level are acquired as the target light level. When a first light level and a second light level differ from each other and a third light level and a fourth light level are equal to each other, the third light level and the fourth light level are acquired as the target light level. The target light level can thus be quickly measured, as in the aspects of the invention described above.

In the spectroscopic measurement apparatus according to the aspect of the invention described above, it is preferable that, when the first light level and the second light level are equal to each other, the third light level and the fourth light level are equal to each other, and the first light level and the third light level differ from each other, the filter driver preferably slightly changes the drive voltage applied to the gap value changer. After the filter driver slightly changes the drive voltage applied to the gap value changer, based on a first light level, a second light level, a third light level, and a fourth light level newly acquired by the detected light level acquisition unit, the target light level acquisition unit preferably acquires the minimum light level acquired before the filter driver slightly changes the drive voltage as the target light level corresponding to the drive voltage before the voltage is changed when the newly acquired first light level and the newly acquired second light level are equal to each other and the newly acquired third light level and the newly acquired fourth light level differ from each other, whereas preferably acquiring the maximum light level acquired before the filter driver slightly changes the drive voltage as the target light level corresponding to the drive voltage before the voltage is changed when the newly acquired first light level and the newly acquired second light level differ from each other and the newly acquired third light level and the newly acquired fourth light level are equal to each other.

As described above, the state in which a first light level and a second light level are equal to each other, a third light level and a fourth light level are equal to each other, and the first light level (second light level) and the third light level (fourth light level) differ from each other means that a peak wavelength or a bottom wavelength is present at the oscillation center of the second substrate. It is difficult to determine whether a peak wavelength or a bottom wavelength is present at the oscillation center based only on how the light level transitions.

In contrast, in the aspect of the invention described above, the filter driver slightly changes the voltage applied to the gap value changer to change the oscillation center of the second substrate. When the oscillation center is slightly changed as described above, the detection pattern is changed to a detection pattern in which the first light level and the second light level are equal to each other and the third light level and the fourth light level differ from each other or a detection pattern in which the first light level and the second light level differ from each other and the third light level and the fourth light level are equal to each other.

The state in which the detection pattern is changed to the former detection pattern by slightly changing the drive voltage means that a bottom wavelength is present within the wavelength range corresponding to the oscillation range of the second substrate. The target light level acquisition unit can therefore acquire a desired target light level in a quick, precise manner by acquiring the first light level and the second light level before the voltage is changed as the target light level corresponding to the oscillation center.

On the other hand, the state in which the detection pattern is changed to the latter detection pattern by slightly changing the drive voltage means that a peak wavelength is present within the wavelength range corresponding to the oscillation range of the second substrate. The target light level acquisition unit can therefore acquire a desired target light level in a quick, precise manner by acquiring the third light level and the fourth light level before the voltage is changed as the target light level corresponding to the oscillation center. In the spectroscopic measurement apparatus according to the aspect of the invention described above, it is preferable that, when the first light level, the second light level, the third light level, and the fourth light level differ from one another, the target light level acquisition unit acquires an average of the light levels acquired in the period from the first timing to the second timing as the target light level.

The state in which a first light level, a second light level, a third light level, and a fourth light level differ from one another means that neither of the oscillation end points of the second substrate corresponds to a maximum light level or a minimum light level and a peak wavelength corresponding to the maximum light level and a bottom wavelength corresponding to the minimum light level are present within the wavelength range corresponding to the oscillation range. When a peak wavelength and a bottom wavelength are present in the wavelength range corresponding to the oscillation range of the second substrate as described above, the average light level substantially agrees with the light level at the oscillation center.

In the detection pattern described above, the target light level acquisition unit can therefore acquire a target light level quickly without waiting until the oscillation of the second substrate stops by calculating the average of the light levels acquired by the detected light level acquisition unit to acquire the target light level.

In the spectroscopic measurement apparatus according to the aspect of the invention, it is preferable that the measurement controller includes an extreme value acquisition unit that detects not only extreme values from the light levels acquired by the detected light level acquisition unit but also extreme value acquisition timings when the extreme values are acquired. The target light level acquisition unit detects equal extreme values from the extreme values detected by the extreme value acquisition unit and acquires the target light level based on periodicity of the extreme value acquisition timings when the equal extreme values are acquired and the natural oscillation cycle of the second substrate.

In the aspect of the invention described above, the oscillation end points during the oscillation of the second substrate are detected based on extreme values. That is, when the light level detected within the second substrate oscillating range changes, an extreme value (local maximum or local minimum) of the light level appears at an oscillation end point. Further, since the second substrate oscillates in accordance with a natural oscillation cycle, an extreme value of the light level corresponding to an oscillation end point appears in the natural oscillation cycle. An oscillation end point can therefore be detected based on the periodicity of the extreme value acquisition timings when extreme values are acquired and the natural oscillation cycle of the second substrate. Once an oscillation end point is detected as described above, the oscillation center is located one-fourth the natural oscillation cycle before (after) the oscillation end point, whereby a target light level corresponding to the oscillation center can be readily detected. The target light level acquisition unit can therefore acquire a target light level quickly without waiting until the oscillation of the second substrate stops, as in the aspects of the invention described above. Further, the target light level acquisition unit, which acquires a measured light level corresponding to the oscillation center as a target light level, can acquire a target light level more precisely than, for example, in a configuration in which an average light level is acquired as a target light level, whereby the spectroscopic measurement apparatus can measure a spectral characteristic with improved precision.

In the spectroscopic measurement apparatus according to the aspect of the invention described above, it is preferable that, when the cycle of the extreme value acquisition timings when the equal extreme values are acquired agrees with the natural oscillation cycle, the target light level acquisition unit acquires a light level at a point of time one-fourth the natural oscillation cycle before or after any of the extreme value acquisition timings as the target light level.

When a peak wavelength or a bottom wavelength is present in the wavelength range corresponding to the oscillation range of the second substrate, a local maximum or a local minimum corresponding to the peak wavelength or the bottom wavelength is detected. However, since the peak wavelength or the bottom wavelength is always detected once whenever the second substrate moves from one of the oscillation end points to the other oscillation end point, the cycle of the extreme value acquisition timings is shorter than one-half the natural oscillation cycle. On the other hand, an extreme value that appears at an oscillation end point appears in the natural oscillation cycle. The timing when the second substrate is positioned at the oscillation center can therefore be readily detected from the extreme value acquisition timings when extreme values appear in the natural oscillation cycle, whereby the light level at any of those timings can be acquired from the light levels acquired by the detected light level acquisition unit.

In the aspect of the invention, when the cycle of the extreme value acquisition timings when equal extreme values are acquired is the natural oscillation cycle, the target light level acquisition unit acquires a light level at a point of time one-fourth the natural oscillation cycle before or one-fourth the natural oscillation cycle after any of the extreme value acquisition timings as a target light level. As a result, in the aspect of the invention, not only can a target light level be quickly acquired, but also the target light level is highly precise because it is based on a measured value. In the spectroscopic measurement apparatus according to the aspect of the invention described above, it is preferable that, when the cycle of the extreme value acquisition timings when equal local maximums are acquired agrees with one-half the natural oscillation cycle and the cycle of the extreme value acquisition timings when equal local minimums are acquired does not agree with the natural oscillation cycle or one-half the natural oscillation cycle, the target light level acquisition unit acquires a light level at a point of time one-fourth the natural oscillation cycle before or one-fourth the natural oscillation cycle after any of the extreme value acquisition timings when the equal local maximums are acquired as the target light level.

When equal local maximums appear in one-half the natural oscillation cycle and the cycle of the extreme value acquisition timings when equal local minimums are acquired is not the natural oscillation cycle or one-half the natural oscillation cycle, it is determined that the local maximums are acquired at the oscillation end points. The timing when the second substrate is positioned at the oscillation center can therefore be readily detected from any of the extreme value acquisition timings when the local maximums are acquired. As a result, not only the target light level can quickly be acquired but also a precise target light level based on a measured value can be acquired in the aspect of the invention. In the spectroscopic measurement apparatus according to the aspect of the invention described above, it is preferable that, when the cycle of the extreme value acquisition timings when equal local minimums are acquired agrees with one-half the natural oscillation cycle and the cycle of the extreme value acquisition timings when equal local maximums are acquired does not agree with the natural oscillation cycle or one-half the natural oscillation cycle, the target light level acquisition unit acquires a light level at a point of time one-fourth the natural oscillation cycle before or one-fourth the natural oscillation cycle after any of the extreme value acquisition timings when the equal local minimums are acquired as the target light level.

When equal local minimums appear in one-half the natural oscillation cycle and the cycle of the extreme value acquisition timings when equal local maximums are acquired is not the natural oscillation cycle or one-half the natural oscillation cycle, it is determined that the local minimums are acquired at the oscillation end points. The timing when the second substrate is positioned at the oscillation center can therefore be readily detected from any of the extreme value acquisition timings when the local minimums are acquired. As a result, not only the target light level can quickly be acquired but also a precise target light level based on a measured value can be acquired in the aspect of the invention. In the spectroscopic measurement apparatus according to the aspect of the invention described above, it is preferable that the filter driver slightly changes the drive voltage applied to the gap value changer when the cycle of the extreme value acquisition timings when equal local maximums are acquired agrees with one-half the natural oscillation cycle and the cycle of the extreme value acquisition timings when equal local minimums are acquired agrees with one-half the natural oscillation cycle, and after the filter driver slightly changes the drive voltage applied to the gap value changer, the target light level acquisition unit acquires the target light level corresponding to the drive voltage after the voltage is changed based on extreme values newly acquired by the extreme value acquisition unit and the extreme value acquisition timings. When each of the cycle of the extreme value acquisition timings when equal local maximums are acquired and the cycle of the extreme value acquisition timings when equal local minimums are acquired is one-half the natural oscillation cycle, a peak wavelength or a bottom wavelength is present at the oscillation center. In this case, it is difficult to determine whether the local maximums or the local minimums have been detected at the oscillation end points.

In contrast, in the aspect of the invention, the filter driver slightly changes the voltage applied to the gap value changer in the case described above. As a result, the oscillation center of the second substrate changes, which shifts not only the peak wavelength or the bottom wavelength present at the oscillation center but also the cycle of the extreme value acquisition timings when the extreme values detected in correspondence with the peak wavelength or the bottom wavelength are acquired. Extreme values corresponding to the oscillation end points can therefore be detected, whereby a target light level corresponding to the oscillation center can be acquired in a quick, precise manner, as in the aspects of the invention described above.

In the spectroscopic measurement apparatus according to the aspect of the invention described above, it is preferable that the filter driver slightly changes the drive voltage applied to the gap value changer when the cycle of the extreme value acquisition timings when equal local maximums are acquired agrees with one-half the natural oscillation cycle and the cycle of the extreme value acquisition timings when equal local minimums are acquired agrees with one-half the natural oscillation cycle. After the filter driver slightly changes the drive voltage applied to the gap value changer, based on extreme values newly acquired by the extreme value acquisition unit and the extreme value acquisition timings, the target light level acquisition unit acquires the local minimums acquired before the filter driver changes the drive voltage as the target light level corresponding to the drive voltage before the voltage is changed when the newly detected equal local maximums agree with the natural oscillation cycle, whereas acquires the local minimums acquired before the filter driver changes the drive voltage as the target light level corresponding to the drive voltage before the voltage is changed when the newly detected equal local minimums agree with the natural oscillation cycle.

As described above, when each of the cycle of the extreme value acquisition timings when equal local maximums are acquired and the cycle of the extreme value acquisition timings when equal local minimums are acquired is one-half the natural oscillation cycle, a peak wavelength or a bottom wavelength is present at the oscillation center. In this case, it is difficult to determine whether the local maximums or the local minimum have been detected at the oscillation end points.

To address the problem, in the aspect of the invention, the filter driver slightly changes the voltage applied to the gap value changer in the case described above, which changes the oscillation center of the second substrate. As a result, not only is the peak wavelength or the bottom wavelength present at the oscillation center shifted, but also the cycle of the extreme value acquisition timings when the extreme values detected in correspondence with the peak wavelength or the bottom wavelength are acquired is shifted.

The fact that the slight change in the drive voltage allows equal local maximums to be acquired in the cycle of the extreme value acquisition timing that agrees with one-half the natural oscillation cycle means that a bottom wavelength is present within the wavelength range corresponding to the oscillation range of the second substrate. The target light level acquisition unit can therefore acquire a desired target light level in a quick, precise manner by acquiring equal local minimums acquired in the cycle of the extreme value acquisition timing that agrees with one-half the natural oscillation cycle before the voltage is changed as the target light level corresponding to the oscillation center.

On the other hand, the fact that the slight change in the drive voltage allows equal local minimums to be acquired in the cycle of the extreme value acquisition timing that agrees with one-half the natural oscillation cycle means that a peak wavelength is present within the wavelength range corresponding to the oscillation range of the second substrate. The target light level acquisition unit can therefore acquire a desired target light level in a quick, precise manner by acquiring equal local maximums acquired in the cycle of the extreme value acquisition timing that agrees with one-half the natural oscillation cycle before the voltage is changed as the target light level corresponding to the oscillation center. In the spectroscopic measurement apparatus according to the aspect of the invention described above, it is preferable that the filter driver slightly changes the drive voltage applied to the gap value changer when the cycle of the extreme value acquisition timings when equal extreme values are acquired does not agree with the natural oscillation cycle or one-half the natural oscillation cycle, and after the filter driver slightly changes the drive voltage applied to the gap value changer, the target light level acquisition unit acquires the target light level based on extreme values newly acquired by the extreme value acquisition unit and the extreme value acquisition timings.

In general, extreme values detected in correspondence with the oscillation end points of the second substrate are detected in the natural oscillation cycle. When a plurality of peak wavelengths and bottom wavelengths are present within the wavelength range corresponding to the oscillation range, and the light levels at the peak wavelengths and the bottom wavelengths agree with the light levels (extreme values) at the oscillation end points, the cycle of the extreme value acquisition timings when equal extreme values are acquired is not the natural oscillation cycle or one-half the natural oscillation cycle. In a light level detection pattern of this type, it is difficult to detect the oscillation end points based on extreme values.

To address the problem, in the aspect of the invention, the filter driver slightly changes the voltage applied to the gap value changer in the case described above, which changes the oscillation center of the second substrate. As a result, not only are the peak wavelengths and the bottom wavelengths present at the oscillation center shifted, but also the cycle of the extreme value acquisition timings when the extreme values detected in correspondence with the peak wavelengths and the bottom wavelengths are acquired is shifted. Extreme values corresponding to the oscillation end points can therefore be detected, whereby a target light level corresponding to the oscillation center can be acquired in a quick, precise manner, as in the aspects of the invention described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment according to the invention will be described below with reference to the drawings.

Configuration of Spectroscopic Measurement Apparatus

Figure 1:
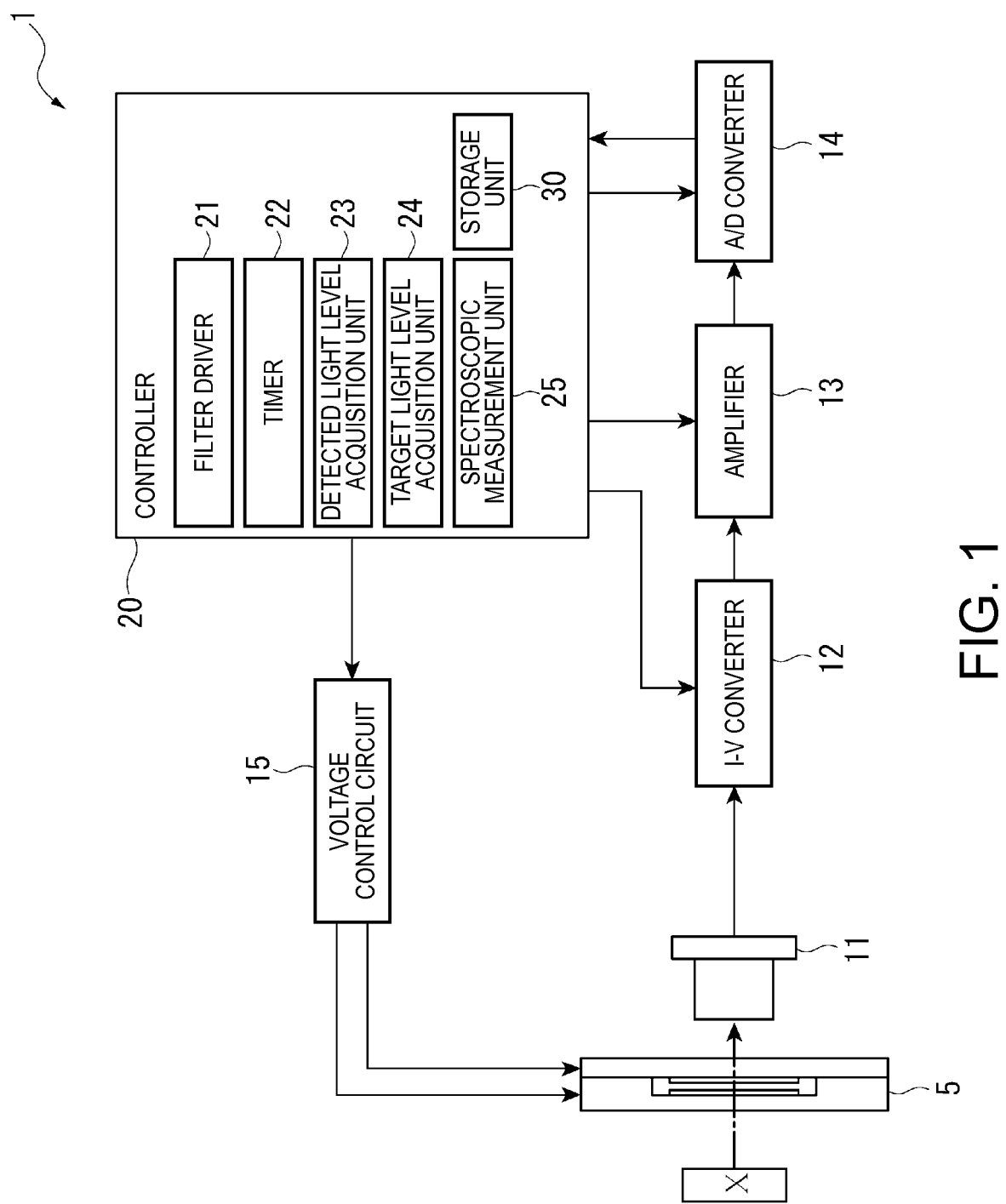
FIG. 1 is a block diagram showing a schematic configuration of a spectroscopic measurement apparatus according to a first embodiment of the invention.

FIG. 1 is a block diagram showing a schematic configuration of a spectroscopic measurement apparatus according to the embodiment of the invention.

A spectroscopic measurement apparatus 1 analyzes the optical intensity at each wavelength of light under measurement reflected off an object X under measurement to provide a measured spectrum.

The spectroscopic measurement apparatus 1 includes a wavelength tunable interference filter 5, a detector (detection unit) 11, an I-V converter 12, an amplifier 13, an A/D converter 14, a voltage control circuit 15, and a controller 20, as shown in FIG. 1.

The detector 11 receives light having passed through the wavelength tunable interference filter 5 and outputs a detection signal (current) according to the optical intensity of the received light.

The I-V converter 12 converts the detection signal inputted from the detector 11 into a voltage value and outputs the voltage value to the amplifier 13.

The amplifier 13 amplifies the voltage according to the detection signal (detection voltage) inputted from the I-V converter 12.

The A/D converter 14 converts the detection voltage (analog signal) inputted from the amplifier 13 into a digital signal and outputs the digital signal to the controller 20.

The voltage control circuit 15 applies a drive voltage to an electrostatic actuator 56, which will be described later, in the wavelength tunable interference filter 5 under the control of the controller 20.

Configuration of Wavelength Tunable Interference Filter

Figure 2:
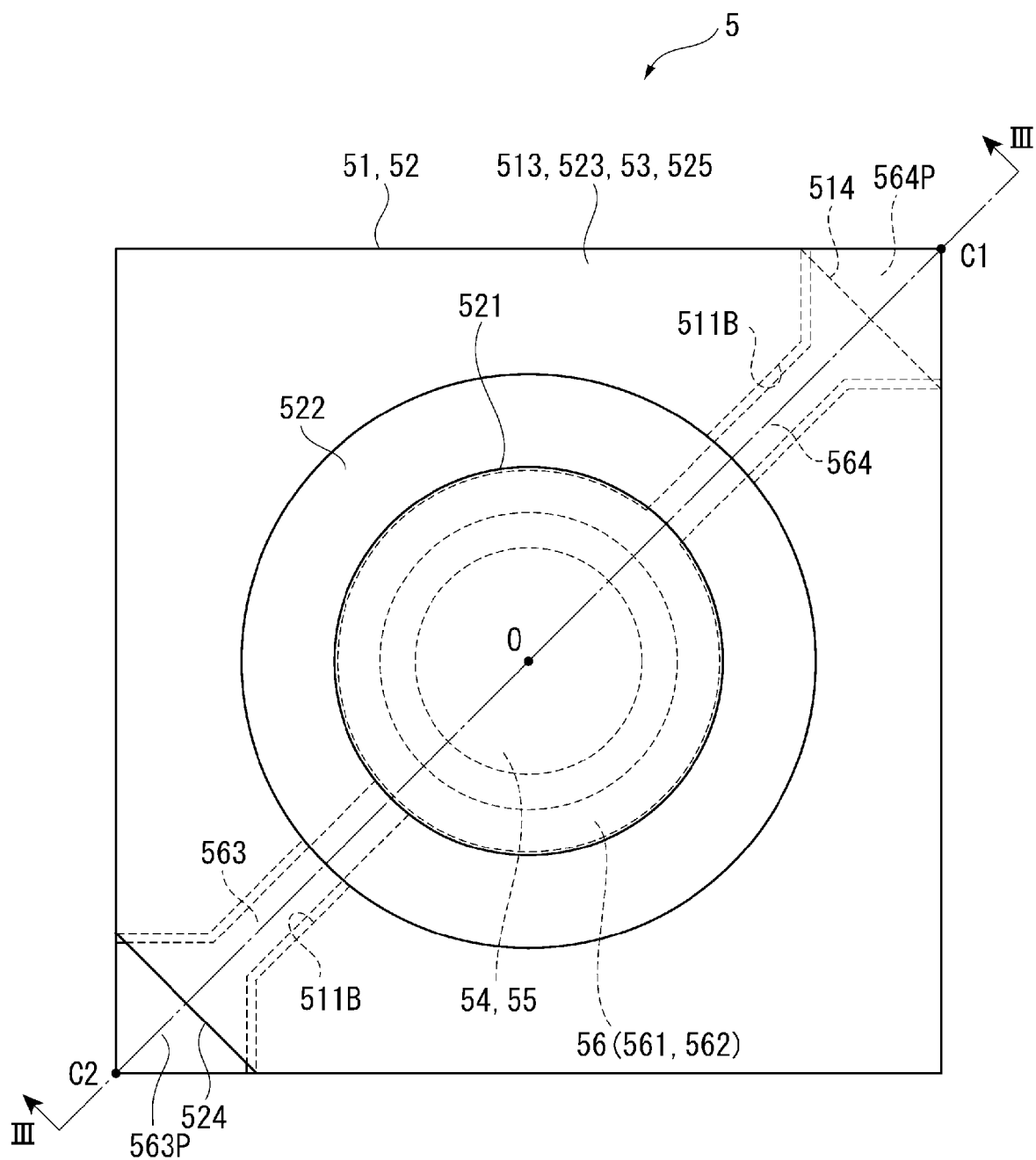
FIG. 2 is a plan view showing a schematic configuration of a wavelength tunable interference filter according to the first embodiment.
Figure 3:
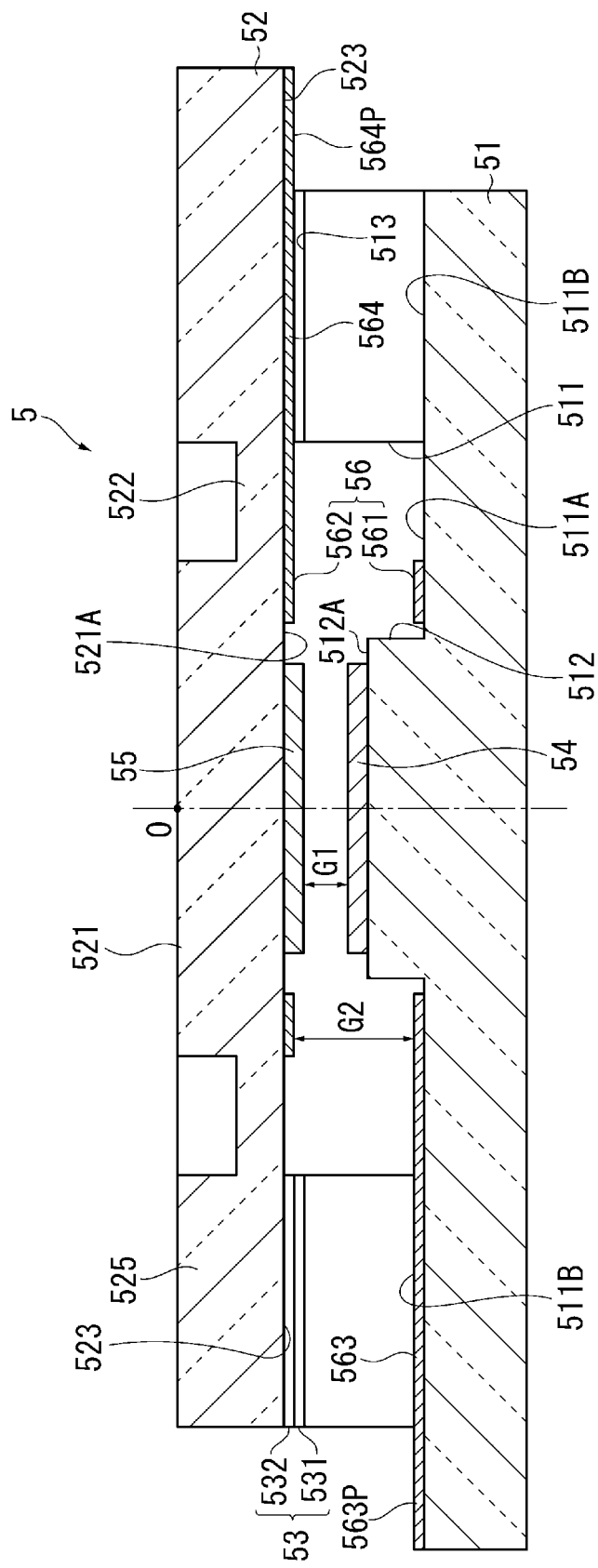
FIG. 3 is a cross-sectional view of the wavelength tunable interference filter taken along the line shown in FIG. 2.

The wavelength tunable interference filter 5 incorporated in the spectroscopic measurement apparatus 1 will now be described below. FIG. 2 is a plan view showing a schematic configuration of the wavelength tunable interference filter. FIG. 3 is a cross-sectional view taken along the line III-III shown in FIG. 2.

The wavelength tunable interference filter 5 is an optical member having a rectangular-plate-like shape or any other suitable shape, as shown in FIG. 2. The wavelength tunable interference filter 5 includes a fixed substrate 51 and a movable substrate 52, as shown in FIG. 3. Each of the fixed substrate 51 and the movable substrate 52 is made, for example, of soda glass, crystalline glass, quartz glass, lead glass, potassium glass, borosilicate glass, alkali-free glass, or any other variety of glass materials, or quartz crystal. The fixed substrate 51 and the movable substrate 52 are integrated with each other by bonding a first bonded portion 513 of the fixed substrate 51 to a second bonded portion 523 of the movable substrate 52 with a bonding film 53 (first bonding film 531 and second bonding film 532) formed, for example, of a plasma polymerized film primarily made, for example, of siloxane. A fixed reflection film 54 that forms a first reflection film according to the embodiment of the invention is provided on the fixed substrate 51, and a movable reflection film 55 that forms a second reflection film according to the embodiment of the invention is provided on the movable substrate 52. The fixed reflection film 54 and the movable reflection film 55 are so disposed that they face each other with an inter-reflection-film gap G1 (gap in the embodiment of the invention) interposed therebetween. The electrostatic actuator 56 used to adjust (change) a gap value of the inter-reflection-film gap G1 is disposed in the wavelength tunable interference filter 5. The electrostatic actuator 56 corresponds to a gap value changer in the embodiment of the invention. The electrostatic actuator 56 is formed of a fixed electrode 561 provided on the fixed substrate 51 and a movable electrode 562 provided on the movable substrate 52. The fixed electrode 561 and the movable electrode 562 face each other with an inter-electrode gap G2 interposed therebetween. The electrodes 561 and 562 may be disposed directly on the surfaces of the fixed substrate 51 and the movable substrate 52 respectively or with another film member interposed therebetween. The gap value of the inter-electrode gap G2 is greater than the gap value of the inter-reflection-film gap G1.

Further, in a filter plan view shown in FIG. 2 in which the wavelength tunable interference filter 5 is viewed in a substrate thickness direction of the fixed substrate 51 (movable substrate 52), the center O of the fixed substrate 51 and the movable substrate 52 in the plan view coincides with not only the centers of the fixed reflection film 54 and the movable reflection film 55 but also the center of a movable portion 521, which will be described later.

In the following description, a plan view viewed in the substrate thickness direction of the fixed substrate 51 or the movable substrate 52, that is, a plan view of the wavelength tunable interference filter 5 viewed in the direction in which the fixed substrate 51, the bonding film 53, and the movable substrate 52 are stacked is called a filter plan view.

Configuration of Fixed Substrate

The fixed substrate 51 has an electrode placement groove 511 and a reflection film placement portion 512 formed therein in an etching process. The fixed substrate 51, which has a thickness greater than that of the movable substrate 52, is not bent by an electrostatic attractive force induced when a voltage is applied between the fixed electrode 561 and the movable electrode 562 or internal stress induced in the fixed electrode 561.

Further, a cutout 514 is formed at a vertex C1 of the fixed substrate 51 and exposes a movable electrode pad 564P, which will be described later, on the side where the fixed substrate 51 is present in the wavelength tunable interference filter 5.

The electrode placement groove 511 is so formed that it has an annular shape around the center O in the plan view of the fixed substrate 51 in the filter plan view. The reflection film placement portion 512 is so formed that it protrudes from a central portion of the electrode placement groove 511 in the filter plan view toward the movable substrate 52. The groove bottom surface of the electrode placement groove 511 forms an electrode placement surface 511A on which the fixed electrode 561 is disposed. The protrusion end surface of the reflection film placement portion 512 forms a reflection film placement surface 512A.

Further, electrode drawing grooves 511B extending from the electrode placement groove 511 toward the vertices C1 and C2 of the outer circumferential edge of the fixed substrate 51 are provided in the fixed substrate 51.

The fixed electrode 561 is disposed on the electrode placement surface 511A of the electrode placement groove 511. More specifically, the fixed electrode 561 is disposed in the area of the electrode placement surface 511A that faces the movable electrode 562 on the movable portion 521, which will be described later. An insulating film for ensuring insulation between the fixed electrode 561 and the movable electrode 562 may further be layered on the fixed electrode 561.

A fixed, drawn electrode 563 extending from the outer circumferential edge of the fixed electrode 561 toward the vertex C2 is provided on the fixed substrate 51. The extension tip (portion located at the vertex C2 of the fixed substrate 51) of the fixed, drawn electrode 563 forms a fixed electrode pad 563P connected to the voltage control circuit 15.

In the present embodiment, one fixed electrode 561 is provided on the electrode placement surface 511A, but for example, two concentric electrodes around the center O in the plan view may be provided (double electrode configuration).

The reflection film placement portion 512 has a substantially cylindrical shape that is coaxial with the electrode placement groove 511 but has a diameter smaller than that of the electrode placement groove 511 and has the reflection film placement surface 512A facing the movable substrate 52 of the reflection film placement portion 512, as described above.

The fixed reflection film 54 is disposed on the reflection film placement portion 512, as shown in FIG. 3. The fixed reflection film 54 can, for example, be a metal film made, for example, of Ag or an alloy film made, for example, of an Ag alloy. The fixed reflection film 54 may alternatively be a dielectric multilayer film formed, for example, of a high refractive index layer made of $TiO_2$ and a low refractive index layer made of $SiO_2$. The fixed reflection film 54 may still alternatively be a reflection film produced by layering a metal film (or alloy film) on a dielectric multilayer film, a reflection film produced by layering a dielectric multilayer film on a metal film (or alloy film), or a reflection film produced by layering a monolayer refractive layer (made, for example, of $TiO_2$ or $SiO_2$) and a metal film (or alloy film) on each other.

Further, an antireflection film may be formed on the light incident surface of the fixed substrate 51 (surface on which no fixed reflection film 54 is formed) in a position corresponding to the fixed reflection film 54. The antireflection film, which can be formed by alternately stacking a low refractive index film and a high refractive index film, lowers visible light reflectance of the surface of the fixed substrate 51 but increases visible light transmittance thereof.

The surface of the fixed substrate 51 that faces the movable substrate 52 and has no electrode placement groove 511, reflection film placement portion 512, or electrode drawing groove 511B formed in the etching process forms the first bonded portion 513. The first bonding film 531 is disposed on the first bonded portion 513 and bonded to the second bonding film 532 disposed on the movable substrate 52. The fixed substrate 51 and the movable substrate 52 are thus bonded to each other, as described above.

Configuration of Movable Substrate

In the filter plan view shown in FIG. 2, the movable substrate 52 includes the movable portion 521 having a circular shape around the center O in the plan view, a holding portion 522 that is coaxial with the movable portion 521 and holds the movable portion 521, and a substrate peripheral portion 525 provided in a portion outside the holding portion 522.

A cutout 524 is formed at the vertex C2 of the movable substrate 52 and exposes the fixed electrode pad 563P when the wavelength tunable interference filter 5 is viewed from the side where the movable substrate 52 is present, as shown in FIG. 2.

The movable portion 521 is formed to be thicker than the holding portion 522, for example, has the same thickness as that of the movable substrate 52 in the present embodiment. The movable portion 521 has a diameter greater than at least the diameter of the outer circumferential edge of the reflection film placement surface 512A in the filter plan view. The movable electrode 562 and the movable reflection film 55 are disposed on the movable portion 521.

An antireflection film may be formed on the surface of the movable portion 521 that faces away from the fixed substrate 51, as in the case of the fixed substrate 51. The antireflection film, which can be formed by alternately stacking a low refractive index film and a high refractive index film, lowers visible light reflectance of the surface of the movable substrate 52 but increases visible light transmittance thereof.

The movable electrode 562 faces the fixed electrode 561 with the inter-electrode gap G2 interposed therebetween and has the same annular shape as that of the fixed electrode 561. A movable, drawn electrode 564 extending from the outer circumferential edge of the movable electrode 562 toward the vertex C1 of the movable substrate 52 is provided on the movable substrate 52. The extension tip (portion located at the vertex C1 of the movable substrate 52) of the movable, drawn electrode 564 forms the movable electrode pad 564P connected to the voltage control circuit 15.

The movable reflection film 55 is disposed on a central portion of a movable surface 521A of the movable portion 521 in such a way that the movable reflection film 55 faces the fixed reflection film 54 with the inter-reflection-film gap G1 interposed therebetween. The movable reflection film 55 has the same configuration as that of the fixed reflection film 54 described above.

In the present embodiment, the gap value of the inter-electrode gap G2 is greater than the gap value of the inter-reflection-film gap G1 by way of example as described above but is not necessarily configured this way. The gap value of the inter-reflection-film gap G1 may be greater than the gap value of the inter-electrode gap G2 depending on the wavelength range of the light to be measured, for example, when the light to be measured is infrared light or far-infrared light.

The holding portion 522 is a diaphragm that surrounds the movable portion 521 and formed to be thinner than the movable portion 521. The thus formed holding portion 522 is more bendable than the movable portion 521, and a slight electrostatic attractive force can displace the movable portion 521 toward the fixed substrate 51. In this process, since the movable portion 521 is thicker and more rigid than the holding portion 522, the shape of the movable portion 521 does not change even when an electrostatic attractive force pulls the holding portion 522 toward the fixed substrate 51. The movable reflection film 55 disposed on the movable portion 521 is therefore not bent, whereby the fixed reflection film 54 and the movable reflection film 55 can always be maintained parallel to each other.

In the present embodiment, the holding portion 522 has a diaphragm-like shape by way of example but is not necessarily configured this way. Alternatively, beam-shaped holding portions may, for example, be provided around the center O in the plan view at equal angular intervals.

The substrate peripheral portion 525 is disposed in a portion outside the holding portion 522 in the filter plan view, as described above. The surface of the substrate peripheral portion 525 that faces the fixed substrate 51 includes the second bonded portion 523 that faces the first bonded portion 513. The second bonding film 532 is provided on the second bonded portion 523, and the second bonding film 532 is bonded to the first bonding film 531, whereby the fixed substrate 51 and the movable substrate 52 are bonded to each other.

Drive Operation of Wavelength Tunable Interference Filter

In the thus configured wavelength tunable interference filter 5, the fixed electrode pad 563P and the movable electrode pad 564P are connected to the voltage control circuit 15. Therefore, when the voltage control circuit 15 applies a voltage between the fixed electrode 561 and the movable electrode 562, a resultant electrostatic attractive force displaces the movable portion 521 toward the fixed substrate 51, whereby the gap value of the inter-reflection-film gap G1 can be changed to a predetermined value.

Figure 4:
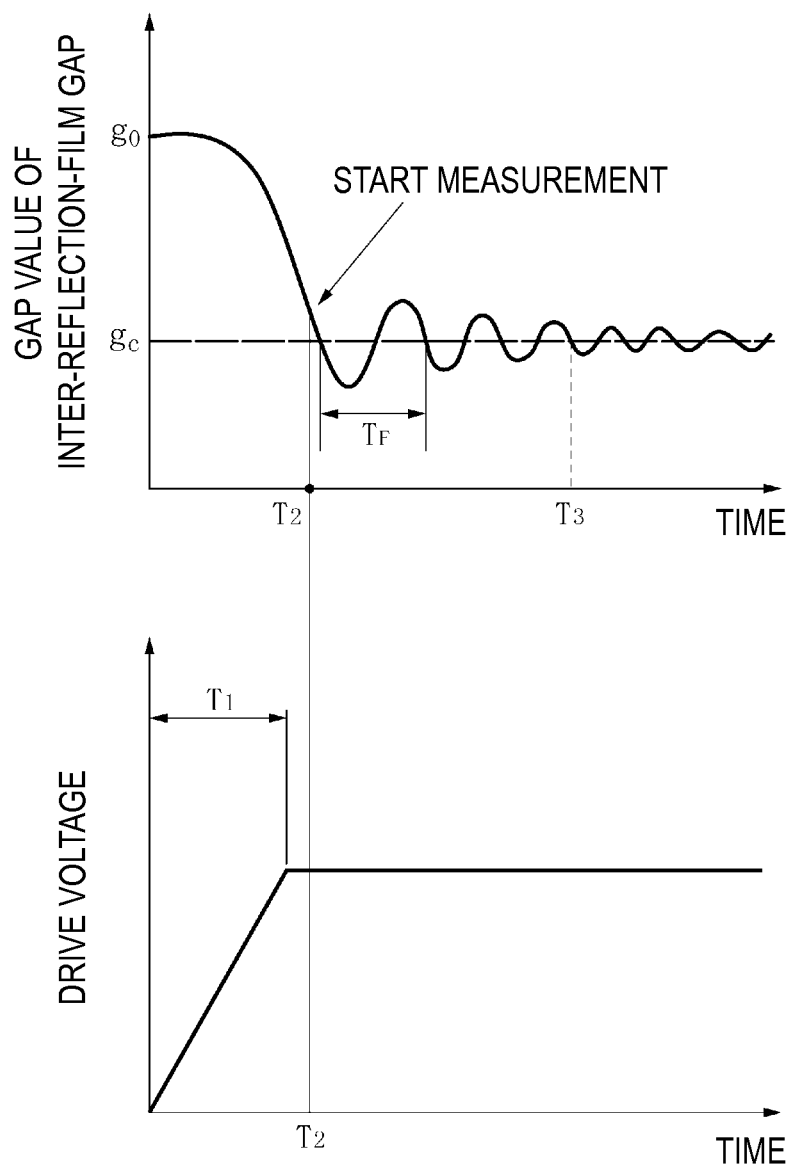
FIG. 4 shows how a gap value of an inter-reflection-film gap changes with time when a drive voltage is applied to the wavelength tunable interference filter according to the first embodiment and how the drive voltage changes with time.
Figure 5:
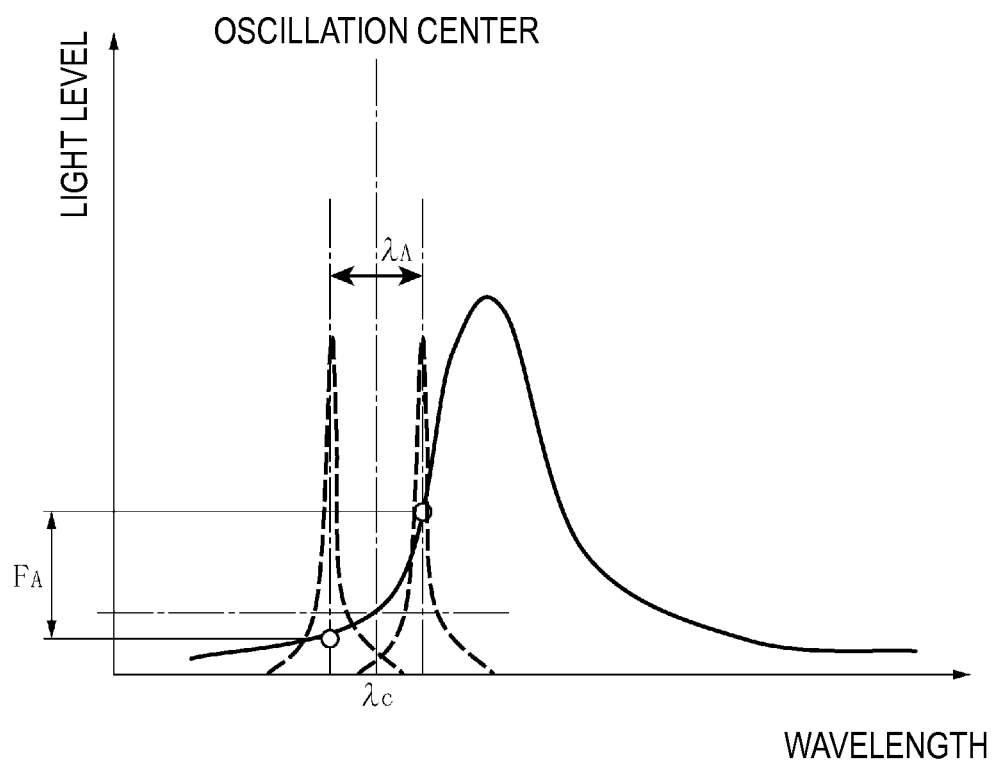
FIG. 5 shows an example of a spectral characteristic of light under measurement.

FIG. 4 shows how the drive voltage applied to the electrostatic actuator 56 changes with time (lower portion of FIG. 4) and how the application of the drive voltage changes inter-reflection-film gap G1 (upper portion of FIG. 4). FIG. 5 shows an example of the light level of light detected by the detector 11.

When a drive voltage is applied to the electrostatic actuator 56, the movable portion 521 receives an electrostatic attractive force oriented toward the fixed substrate 51 and is displaced during a drive voltage rising period $T_1$, as shown in FIG. 4. The movable portion 521 also receives a restoration force produced by the elasticity of the holding portion 522 and causing the movable portion 521 to return to an initial position (initial state). As a result, after the drive voltage rising period $T_1$, the movable portion 521 oscillates up and down with respect to an oscillation center, and the gap value of the inter-reflection-film gap periodically changes in a sinusoidal manner up and down with respect to a gap value $g_c$, which corresponds to the oscillation center of the movable portion, as shown in FIG. 4. In this process, the movable portion 521 oscillates at a predetermined natural oscillation cycle $T_F$ based on an elastic force that the holding portion 522 has.

The gap value of the inter-reflection-film gap G1 therefore changes between values corresponding to oscillation end-points of the movable portion 521 while the movable portion 521 oscillates. As a result, the wavelength of the light passing through the wavelength tunable interference filter 5 changes within a wavelength range $\lambda_A$ corresponding to the oscillation range, and the light level changes within a range $F_A$ accordingly, as shown in FIG. 5. The broken lines shown in FIG. 5 at the oscillation end points of the movable portion 521 represent the resolution of the wavelength tunable interference filter. The oscillation of the movable portion 521 attenuates with time and eventually converges to the oscillation center of the movable portion 521 where the electrostatic attractive force produced by the electrostatic actuator 56 balances with the elastic force produced by the holding portion 522, and light of a wavelength $\lambda_c$ corresponding to the gap value $g_c$ of the inter-reflection-film gap G1 passes through the wavelength tunable interference filter 5.

In FIG. 4, the attenuation factor is exaggerated to clearly show the oscillation of the movable portion 521 and the attenuation of the oscillation, but the natural oscillation cycle of the movable portion 521 actually ranges from 50 to 200 μs in a reduced pressure environment and it takes about 300 ms before the oscillation stops. Further, the natural oscillation cycle of the movable portion 521 and the period that elapses before the oscillation stops depend on the measurement environment where the wavelength tunable interference filter 5 is installed and other factors. Under the atmospheric pressure, since air resistance between the reflection films greatly increases the period required to reach a desired inter-reflection-film gap in the first place as compared with the effect of the oscillation, it is preferable to install the wavelength tunable interference filter 5 in an environment in which a reduced pressure is maintained.

Configuration of Control Circuit Portion

Referring back to FIG. 1, the controller 20 in the spectroscopic measurement apparatus 1 will be described.

The controller 20, which corresponds to a measurement controller according to the embodiment of the invention, is a combination of a CPU, a memory, and other components and controls overall operation of the spectroscopic measurement apparatus 1. The controller 20 includes a filter driver 21, a timer 22, a detected light level acquisition unit 23, a target light level acquisition unit 24, and a spectroscopic measurement unit 25, as shown in FIG. 1. The controller 20 further includes a storage unit 30 that stores a variety of data. The storage unit 30 stores V-λ, data representing the relationship between the wavelength of light passing through the wavelength tunable interference filter 5 versus the drive voltage applied to the electrostatic actuator 56 in the wavelength tunable interference filter 5. The storage unit 30 further stores a light level acquired by the detected light level acquisition unit 23, a target light level acquired by the target light level acquisition unit 24, and other data. The storage unit 30 further stores a natural oscillation cycle $T_F$ that the movable substrate 52 has (natural oscillation cycle $T_F$ of the movable portion 521). The storage unit 30 may further store, for example, P-$T_F$ data representing the relationship between the natural oscillation cycle $T_F$ versus the pressure P in the measurement environment.

The filter driver 21 sets a drive voltage for setting the wavelength of light to be picked up through the wavelength tunable interference filter 5 and controls the voltage control circuit 15 to apply the drive voltage to the electrostatic actuator 56 in the wavelength tunable interference filter 5. In this process, the filter driver 21 reads a drive voltage corresponding to a target wavelength to be measured from the V-λ, data stored in the storage unit 30 and applies the thus read drive voltage to the electrostatic actuator 56.

The timer 22 counts an elapsed period starting from the voltage application timing when the filter driver 21 applies the drive voltage to the electrostatic actuator 56.

After the filter driver 21 applies the drive voltage to the electrostatic actuator 56, the detected light level acquisition unit 23 acquires light levels in a period from a predetermined measurement start timing $T_2$ (first point of time) to a measurement stop timing $T_3$ (second point of time).

In the present embodiment, an analog current according to the light level received by the detector 11 is inputted via the I-V converter 12, the amplifier 13, and the A/D converter 14 to the controller 20 in the form of digital voltage signal. The detected light level acquisition unit 23 therefore acquires the inputted digital voltage signal at preset temporal intervals (1 μs for example) to acquire light levels at the predetermined temporal intervals. The detected light level acquisition unit 23 can thus detect a light level detection pattern that represents how the light level transitions, for example, at 1 μs intervals.

The measurement start timing $T_2$, when the detected light level acquisition unit 23 starts acquiring light levels, is set at a point after the drive voltage rising time $T_1$ elapses, as shown in FIG. 4. The reason for this is that there is a slight delay between the application of the drive voltage and the movement of the movable portion 521. As described above, changes in the light level during the oscillation of the movable portion 521 can be acquired by setting the measurement start timing $T_2$ at a point after a preset period (10 μs, for example) elapses from the end of the drive voltage rising period $T_1$.

The measurement stop timing T3 may be set at a point after at least two cycles of the natural oscillation cycle of the movable portion 521 (natural oscillation cycle that movable substrate 52 has) are acquired.

The target light level acquisition unit 24 acquires, with the movable portion 521 positioned at the oscillation center, the light level of light of the wavelength passing through the wavelength tunable interference filter 5 (target light level) based on the light levels acquired by the detected light level acquisition unit 23.

To this end, the target light level acquisition unit 24 detects a maximum light level and a minimum light level from the light levels acquired during the period from the measurement start timing $T_2$ to the measurement stop timing $T_3$ and acquires a target light level based on the timings when the maximum light level and the minimum light level are detected.

A method for acquiring a target light level by using the target light level acquisition unit will be described in detail in the description of a spectroscopic measurement method, which will be described later.

The spectroscopic measurement unit 25 measures a spectral characteristic of the light under measurement based on the target light levels corresponding to the drive voltages and acquired by the target light level acquisition unit 24. The spectroscopic measurement unit 25 may further create a spectrum curve from the measurement results.

Spectroscopic Measurement Method Used with Spectroscopic Measurement Apparatus

A spectroscopic measurement method used with the spectroscopic measurement apparatus 1 described above will next be described with reference to the drawings.

Figure 6:
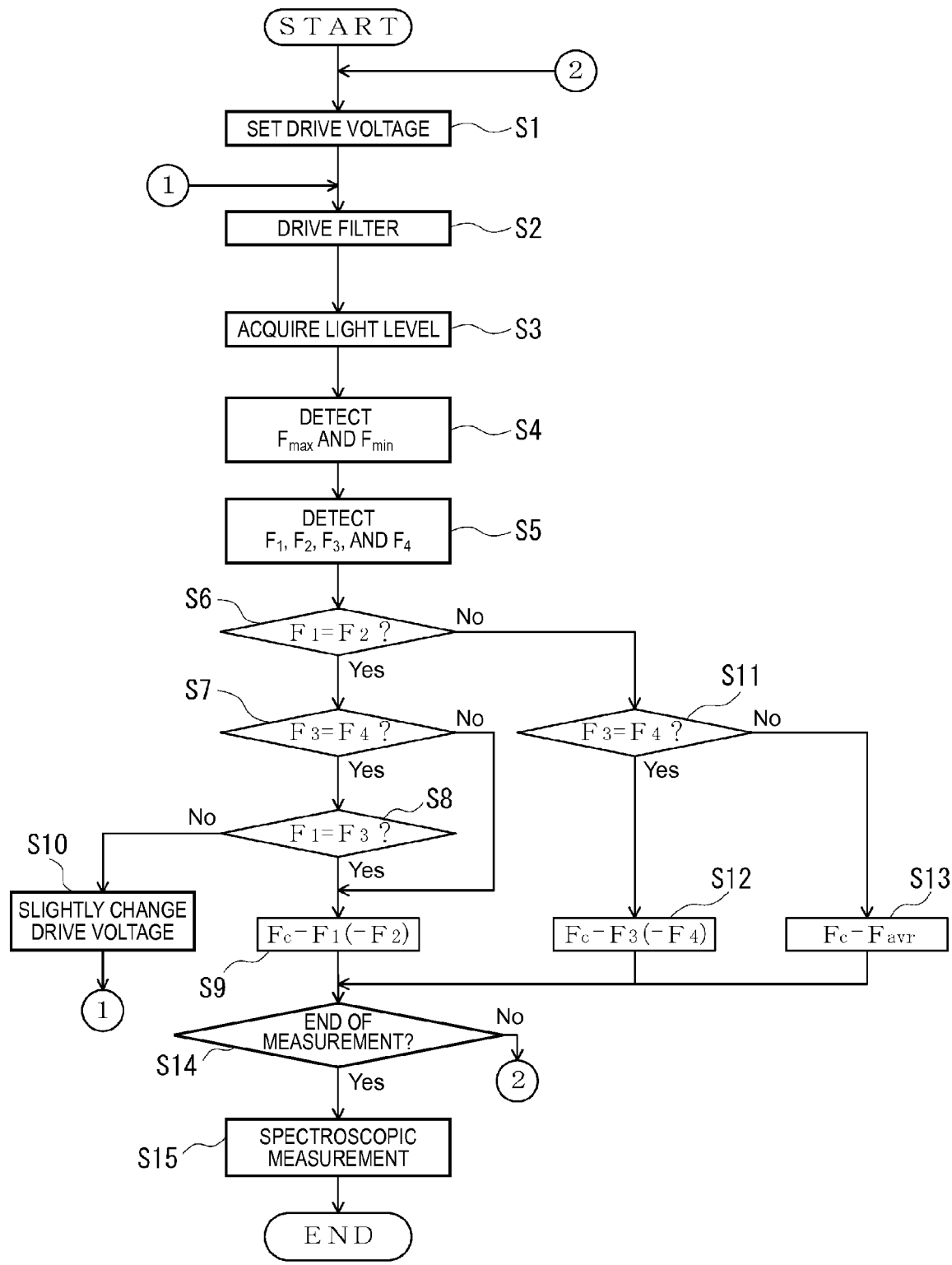
FIG. 6 is a flowchart of a spectroscopic measurement method used with the spectroscopic measurement apparatus according to the first embodiment.

FIG. 6 is a flowchart of the spectroscopic measurement method according to the present embodiment.

In the spectroscopic measurement method used with the spectroscopic measurement apparatus 1 according to the present embodiment, after measurement starts, the filter driver 21 first refers to the V-λ, data stored in the storage unit 30 and sets a drive voltage applied to the electrostatic actuator 56 in the wavelength tunable interference filter 5 (S1), as shown in FIG. 6. In the present embodiment, a target wavelength to be measured is successively changed at predetermined measurement intervals within a wavelength range to be measured, and the light level at the target wavelength (target light level) is successively acquired. A spectral characteristic of the light under measurement is thus measured. In other words, in S1, the filter driver 21 changes the setting of the drive voltage applied to the electrostatic actuator 56 at predetermined voltage intervals (measurement intervals) whenever a target light level is acquired. The measurement intervals may be set as appropriate by a measurement operator or may be set in advance.

The filter driver 21 then controls the voltage control circuit 15 to drive the electrostatic actuator 56 in the wavelength tunable interference filter 5 by applying the set drive voltage thereto (S2). The movable portion 521 in the wavelength tunable interference filter 5 is thus displaced toward the fixed substrate 51. At this point, an electrostatic attractive force produced by the electrostatic actuator 56 and an elastic force produced by the holding portion 522 act on the movable portion 521, which oscillates at a predetermined natural oscillation period $T_F$ up and down with respect to the oscillation center, as described above. The timer 22 starts counting an elapsed period upon the drive voltage application of the filter driver 21 to the electrostatic actuator 56.

The detected light level acquisition unit 23 then acquires light levels detected by the detector 11 in a period from the measurement start timing $T_2$ to the measurement stop timing $T_3$ based on the elapsed period counted by the timer 22 (S3).

Figure 7:
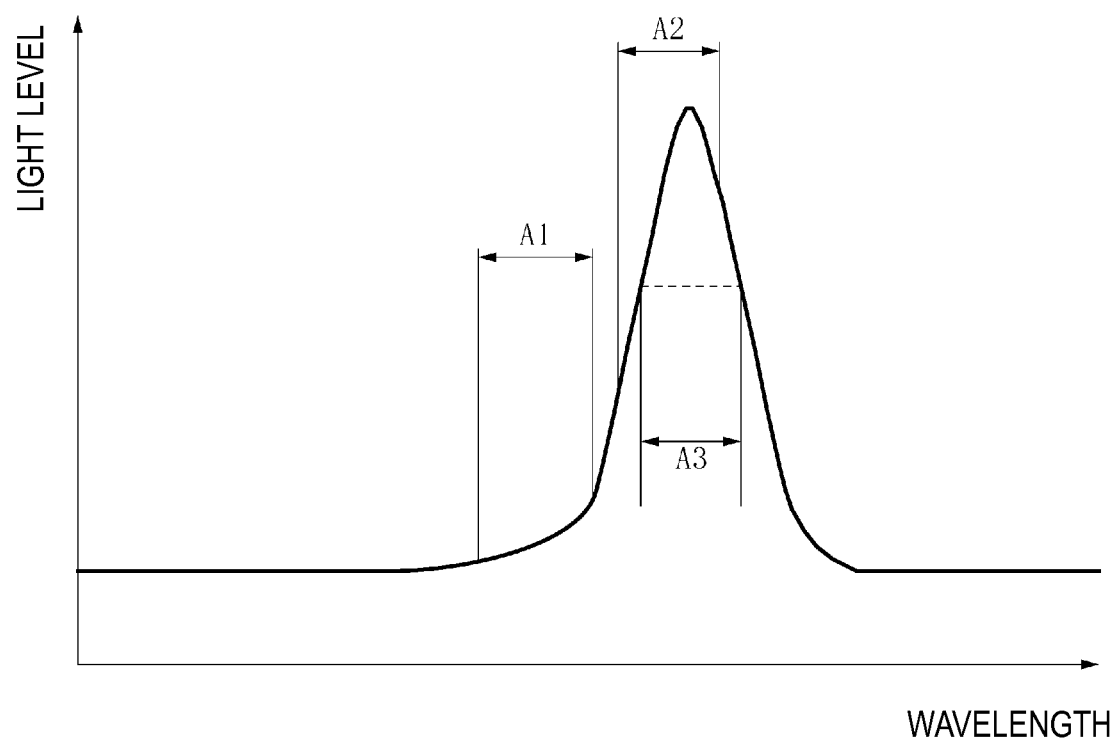
FIG. 7 shows another example of a spectral characteristic of light under measurement and examples of an oscillation range of a movable portion.
Figure 8:
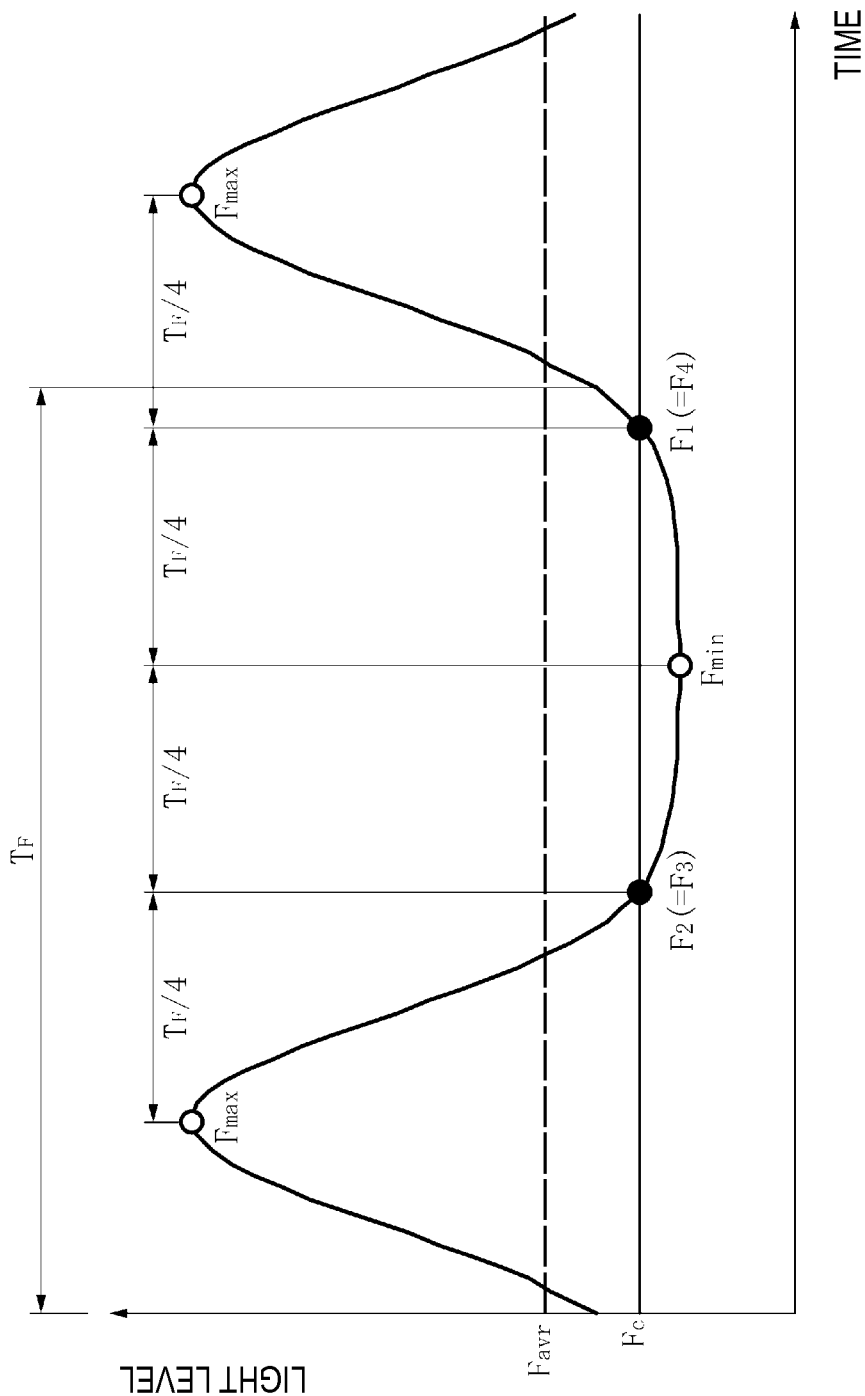
FIG. 8 shows a detected light level versus time within a range A1 shown in FIG. 7 (light level detection pattern).
Figure 9:
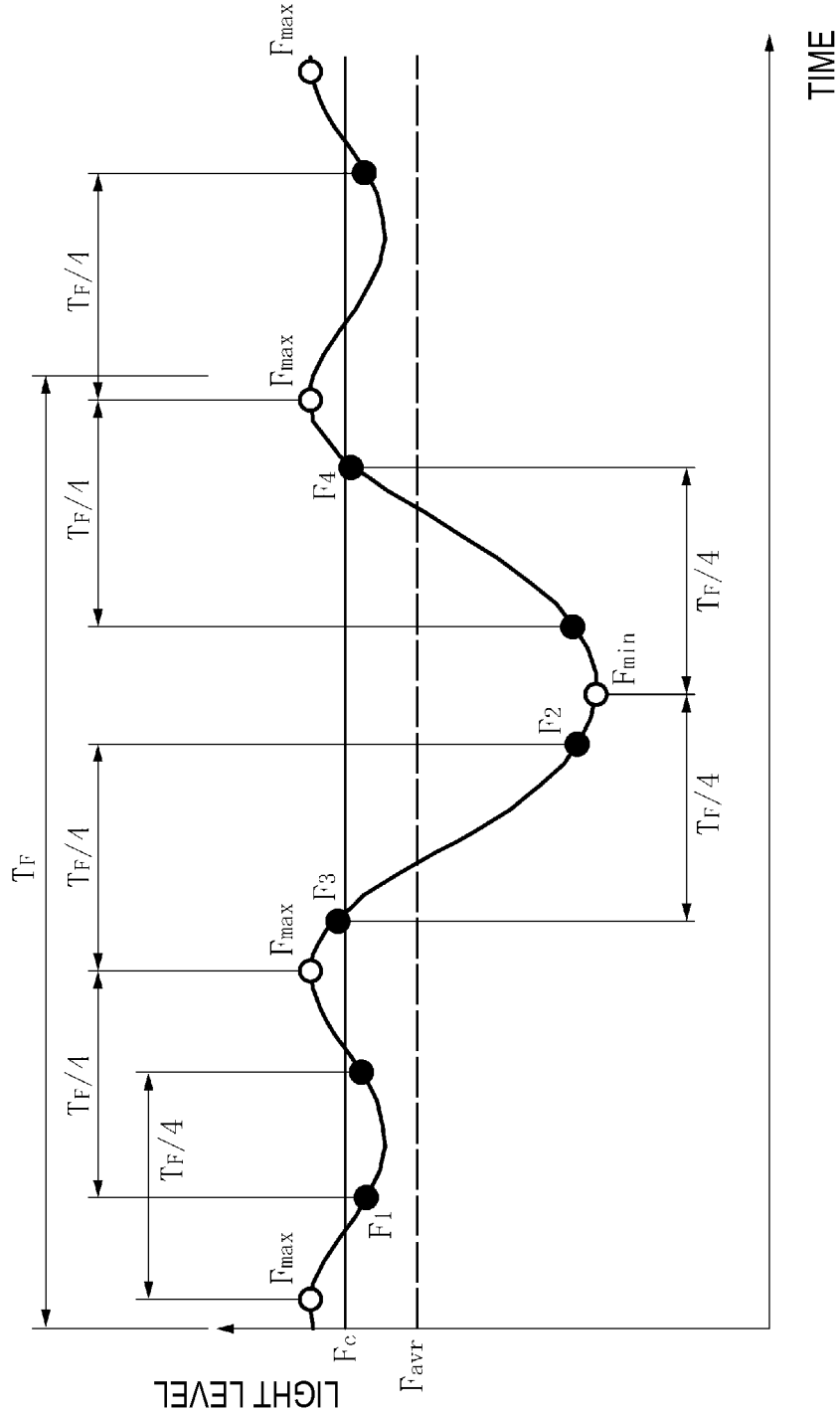
FIG. 9 shows a detected light level versus time within a range A2 shown in FIG. 7 (light level detection pattern).
Figure 10:
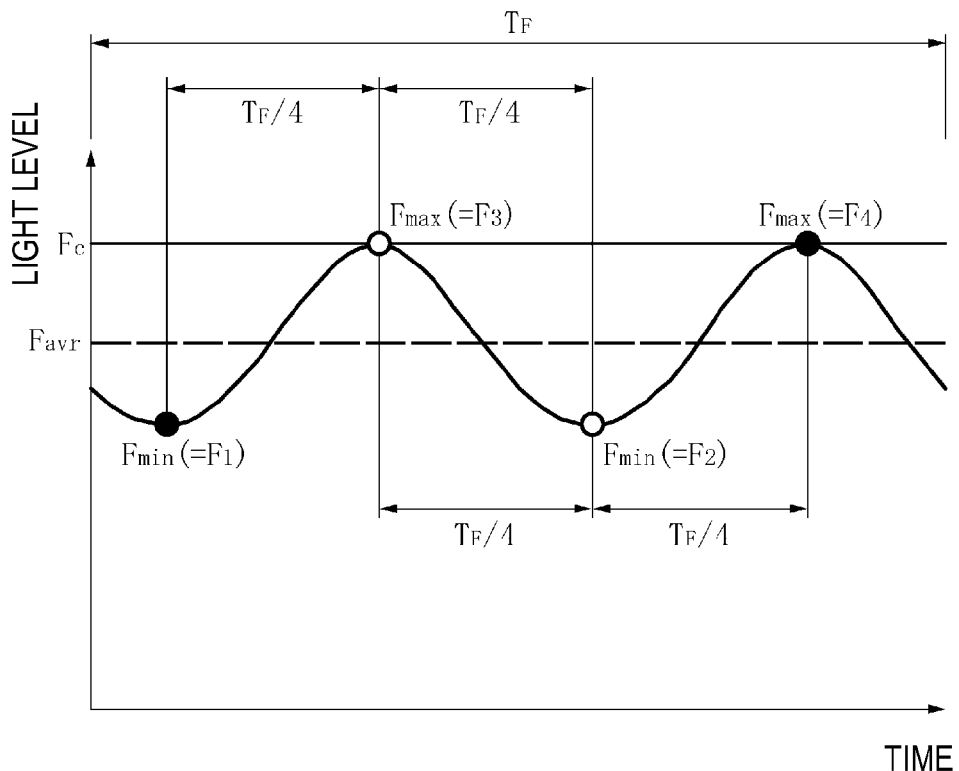
FIG. 10 shows a detected light level versus time within a range A3 shown in FIG. 7 (light level detection pattern).
Figure 11:
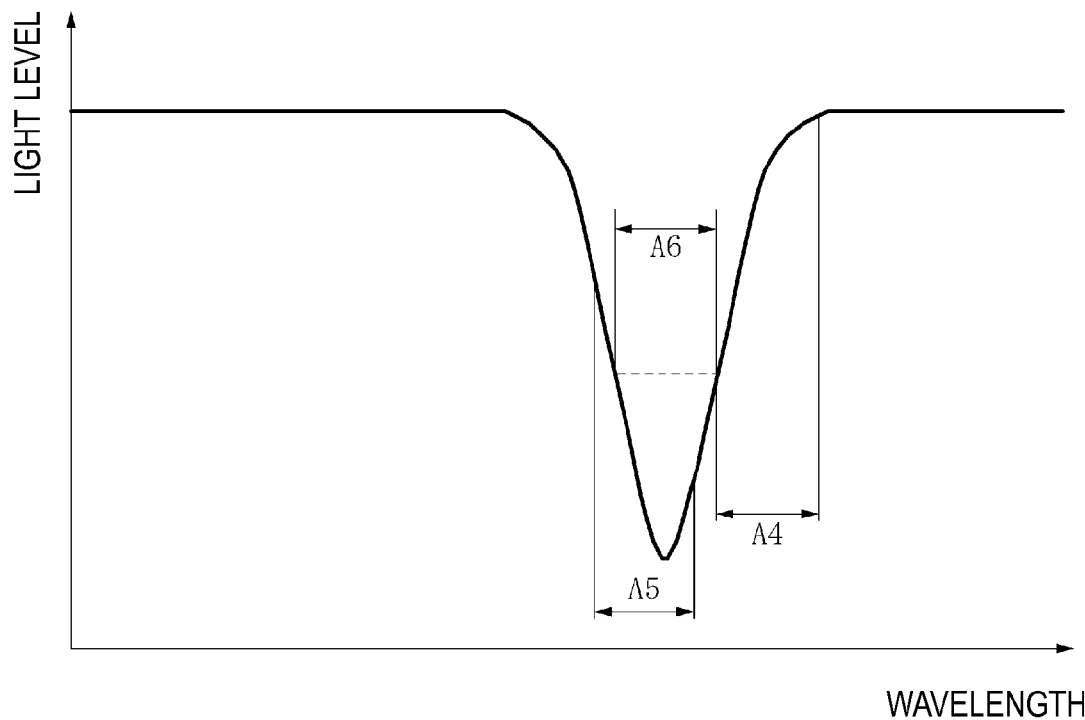
FIG. 11 shows another example of the spectral characteristic of the light under measurement and examples of the oscillation range of the movable portion.
Figure 12:
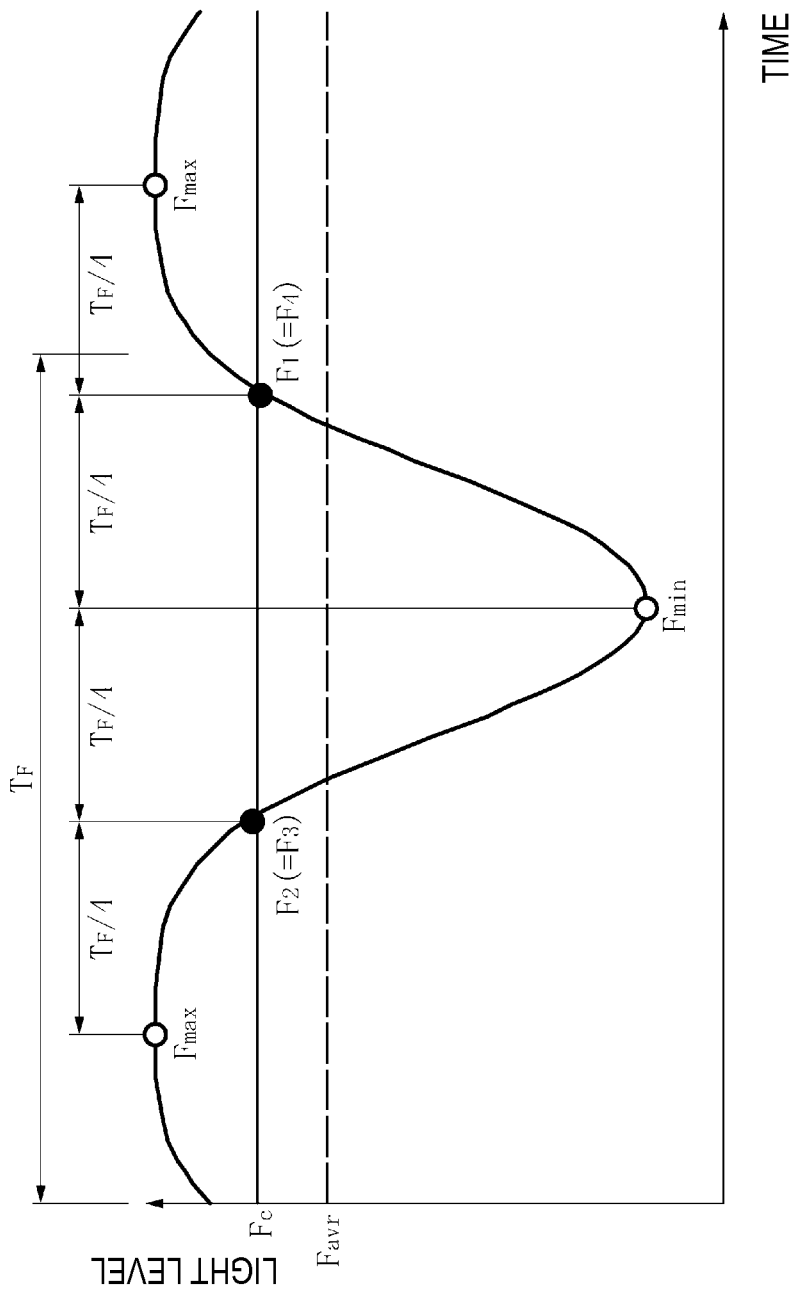
FIG. 12 shows a detected light level versus time within a range A4 shown in FIG. 11 (light level detection pattern).
Figure 13:
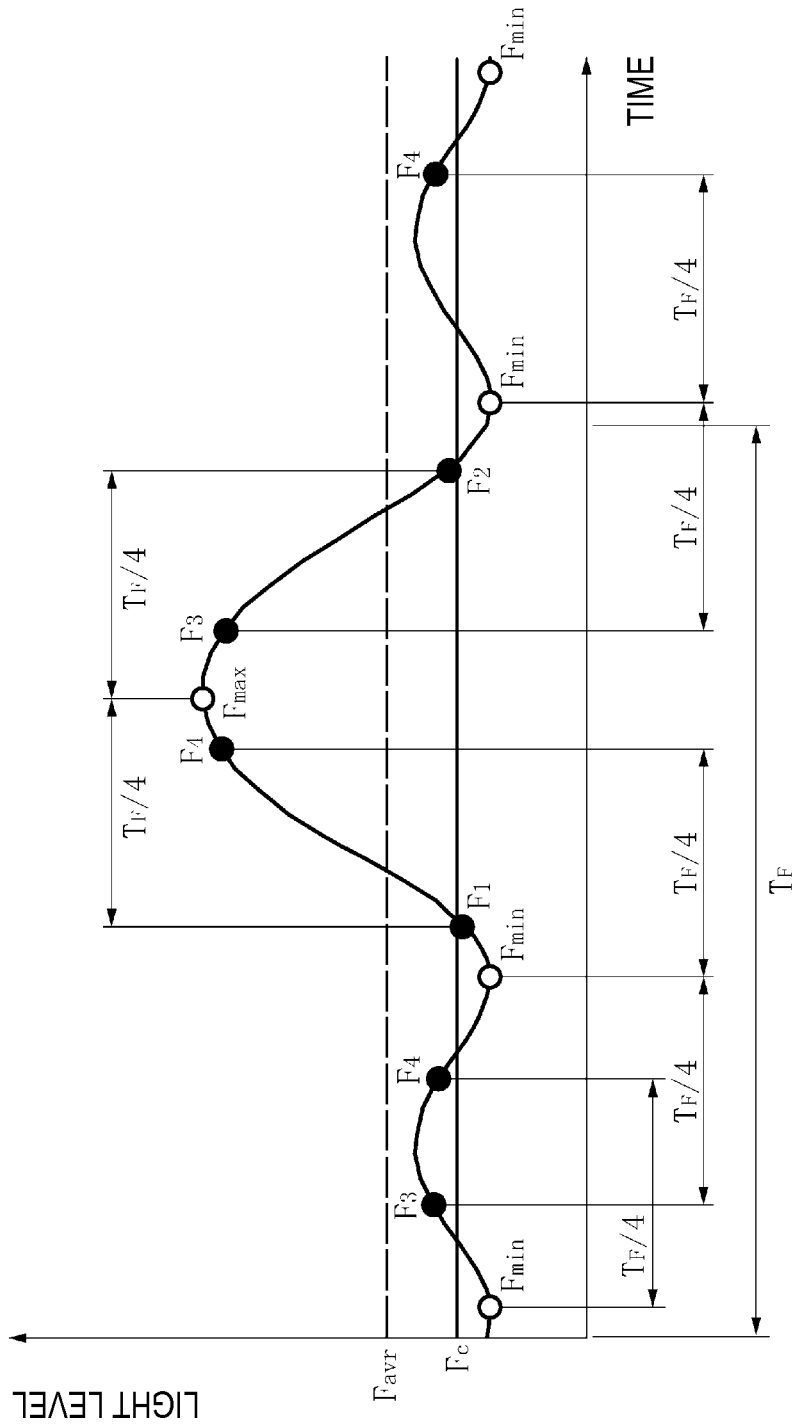
FIG. 13 shows a detected light level versus time within a range A5 shown in FIG. 11 (light level detection pattern).
Figure 14:
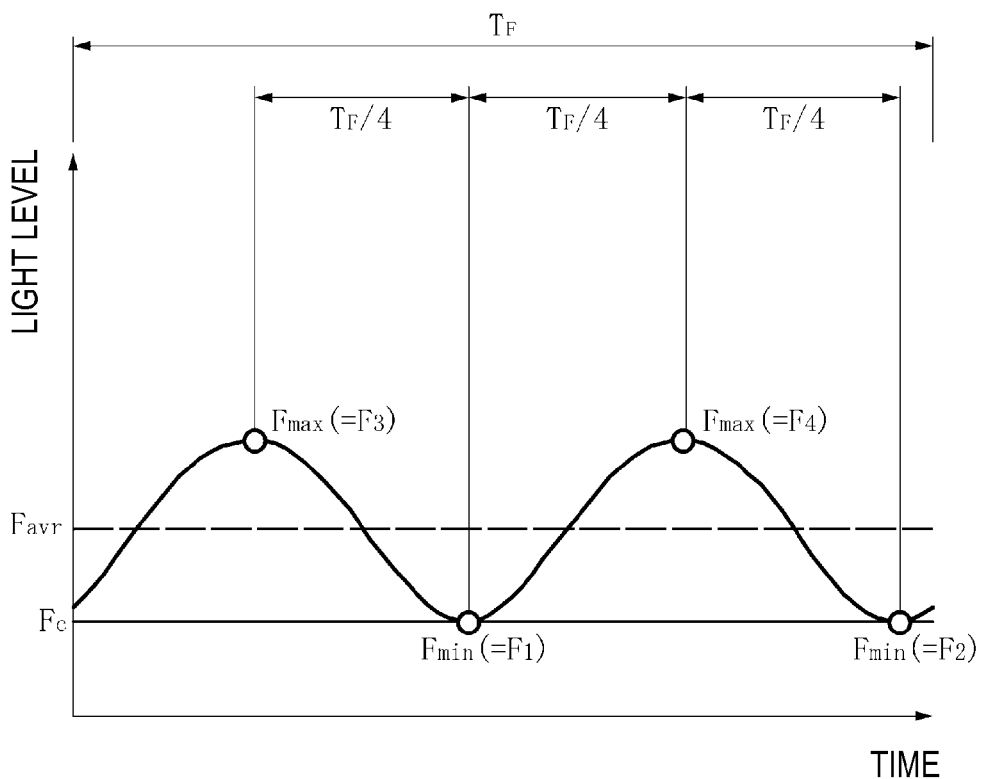
FIG. 14 shows a detected light level versus time within a range A6 shown in FIG. 11 (light level detection pattern).
Figure 15:
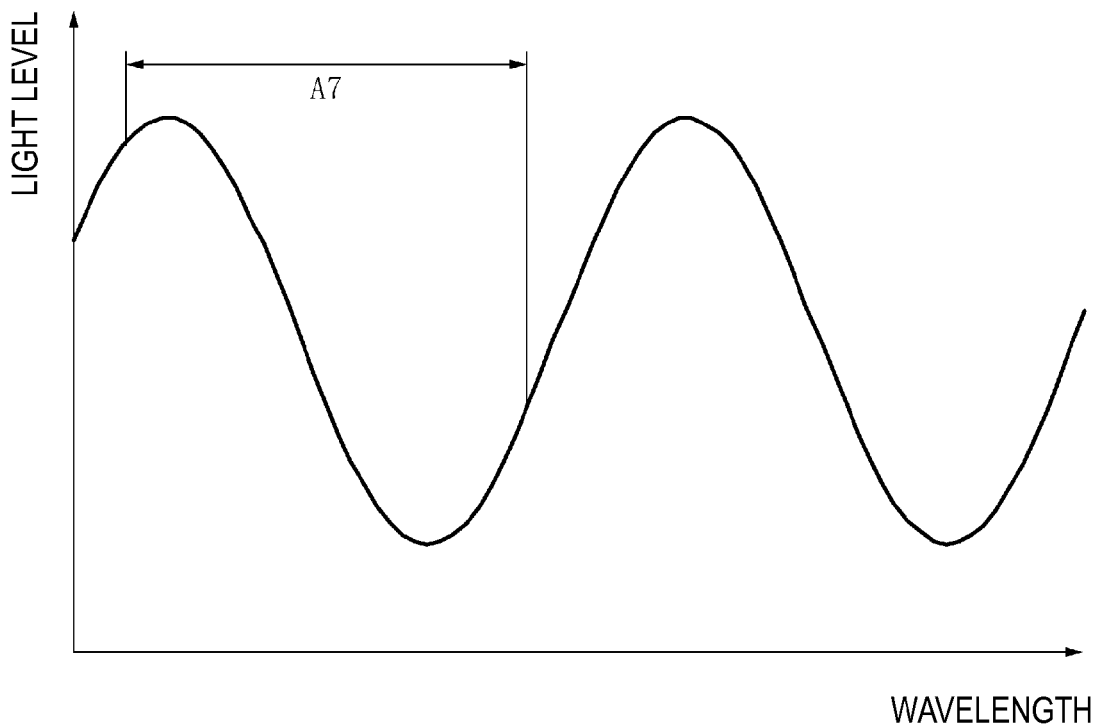
FIG. 15 shows another example of the spectral characteristic of the light under measurement and examples of the oscillation range of the movable portion.
Figure 16:
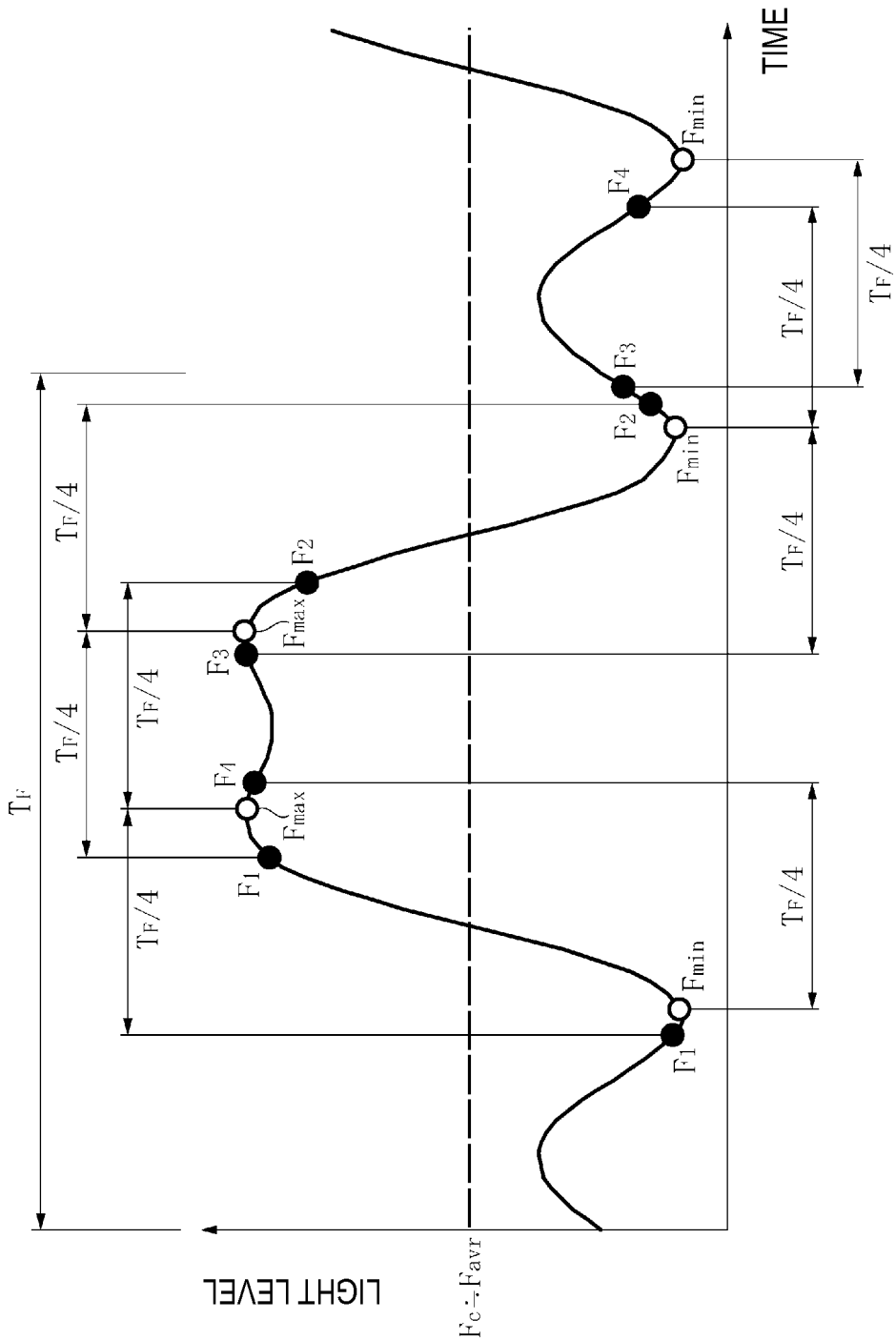
FIG. 16 shows a detected light level versus time within a range A7 shown in FIG. 15 (light level detection pattern).

FIGS. 7, 11, and 15 show examples of a spectral characteristic of light under measurement. In FIGS. 7, 11, and 15, ranges A1 to A7 represent wavelength ranges of light outputted through the wavelength tunable interference filter 5 in corresponding with the oscillation ranges of the movable portion 521. FIG. 8 shows light levels acquired within the range A1 versus the time at which each of the light levels is acquired (light level detection pattern). FIG. 9 shows light levels acquired within the range A2 versus the time at which each of the light levels is acquired (light level detection pattern). FIG. 10 shows light levels acquired within the range A3 and the time at which each of the light levels is acquired (light level detection pattern). FIG. 12 shows light levels acquired within the range A4 and the time at which each of the light levels is acquired (light level detection pattern). FIG. 13 shows light levels acquired within the range A5 and the time at which each of the light levels is acquired (light level detection pattern). FIG. 14 shows light levels acquired within the range A6 and the time at which each of the light levels is acquired (light level detection pattern). FIG. 16 shows light levels acquired within the range A7 and the time at which each of the light levels is acquired (light level detection pattern). In FIGS. 8 to 10, 12 to 14, and 16, $F_{avr}$ represents the average of the light levels detected within the respective oscillation ranges.

In S3, since the movable portion 521 oscillates, the detector 11 detects light of a wavelength range corresponding to an oscillation range, such as the ranges A1 to A7 shown in FIGS. 7, 11, and 15. When the detector 11 detects light, a digital signal according to the detected light level is inputted to the controller 20 via the I-V converter 12, the amplifier 13, and the A/D converter 14. The detected light level acquisition unit 23 then acquires the inputted digital signal, for example, at 1-µs intervals and stores the light levels based on the acquired signals in the storage unit 30 as appropriate. Light level transition states (light level detection patterns) shown in FIGS. 8 to 10, 12 to 14, and 16 are thus acquired.

The target light level acquisition unit 24 then detects a maximum light level $F_{max}$ and a minimum light level $F_{min}$ based on the light levels acquired in S3 (S4). The target light level acquisition unit 24 further detects a first light level $F_1$ acquired at the time one-fourth the natural oscillation cycle $T_F$ of the movable portion 521 before the timing when the maximum light level $F_{max}$ is acquired, a second light level $F_2$ acquired at the time one-fourth the natural oscillation cycle $T_F$ of the movable portion 521 after the timing when the maximum light level $F_{max}$ is acquired, a third light level $F_3$ acquired at the time one-fourth the natural oscillation cycle $T_F$ of the movable portion 521 before the timing when the minimum light level $F_{min}$ is acquired, and a fourth light level $F_4$ acquired at the time one-fourth the natural oscillation cycle $T_F$ of the movable portion 521 after the timing when the minimum light level $F_{min}$ is acquired (S5).

The target light level acquisition unit 24 then acquires a target light level $F_c$ corresponding to the oscillation center of the movable portion 521 based on the first light level $F_1$, the second light level $F_2$, the third light level $F_3$, and the fourth light level $F_4$.

Specifically, the target light level acquisition unit 24 compares the light level $F_1$ with the light level $F_2$ and determines whether or not they are equal to each other (S6). The term "equal to each other" used herein includes not only a case where the light levels completely agree with each other but also a case where there is a discrepancy between the light levels to the extent that the discrepancy does not affect measurement precision. In the latter case, values substantially equal to each other are determined to be equal to each other.

When the first light level $F_1$ and the second light level $F_2$ are determined to be equal to each other (determined to be "Yes") in S6, the light level detection pattern corresponding to the oscillation of the movable portion 521 is one of those shown in FIGS. 8, 10, 12, 13, and 14. In this case, the target light level acquisition unit 24 determines whether or not the third light level $F_3$ and the fourth light level $F_4$ are equal to each other (S7).

When the third light level $F_3$ and the fourth light level $F_4$ are determined to be equal to each other (determined to be "Yes") in S7, the light level detection pattern corresponding to the oscillation of the movable portion 521 is one of those shown in FIGS. 8, 10, 12, and 14. In this case, the target light level acquisition unit 24 further determines whether or not the first light level $F_1$ and the third light level $F_3$ are equal to each other (S8).

When the first light level $F_1$ and the third light level $F_3$ are determined to be equal to each other (determined to be "Yes") in S8, the light level detection pattern corresponding to the oscillation of the movable portion 521 is either of those shown in FIGS. 8 and 12 (pattern I).

The pattern I means that the movable portion 521 is positioned at either of the oscillation end points at the timing when the maximum light level $F_{max}$ and the minimum light level $F_{min}$ are detected. The oscillation center of the movable portion 521 is therefore the position of the movable portion 521 shifted from the oscillation end point by a distance corresponding to one-fourth the natural oscillation cycle $T_F$ forward (or one-fourth the natural oscillation cycle $T_F$ backward), and any of the first light level $F_1$, the second light level $F_2$, the third light level $F_3$, and the fourth light level $F_4$ is the target light level $F_c$. When the light level detection pattern is the pattern I, the target light level acquisition unit 24 therefore acquires the light level $F_1$ (=second light level $F_2$=third light level $F_3$=fourth light level $F_4$) as the target light level $F_c$ (S9).

On the other hand, when the third light level $F_3$ and the fourth light level $F_4$ are determined to differ from each other (determined to be "No") in S7, the light level detection pattern corresponding to the oscillation of the movable portion 521 is that shown in FIG. 13 (pattern II).

The pattern II means that the movable portion 521 is positioned at either of the oscillation end points at the timing when the maximum light level $F_{max}$ is detected, and that the minimum light level $F_{min}$ corresponds to a bottom wavelength. The oscillation center of the movable portion 521 is therefore the position of the movable portion 521 at the time one-fourth the natural oscillation cycle $T_F$ before (or one-fourth the natural oscillation cycle $T_F$ after) the timing when the maximum light level $F_{max}$ corresponding to the oscillation end point is detected, and either of the first light level $F_1$ and the second light level $F_2$ is the target light level $F_c$. When the light level detection pattern is the pattern II, the target light level acquisition unit 24 therefore also acquires the first light level $F_1$ (=second light level $F_2$) as the target light level $F_c$, as in S9.

When the first light level $F_1$ and the third light level $F_3$ are determined to differ from each other (determined to be "No") in S8, the light level detection pattern corresponding to the oscillation of the movable portion 521 is either of those shown in FIGS. 10 and 14 (pattern III).

When the light level detection pattern is the pattern III, either the maximum light level $F_{max}$ or the minimum light level $F_{min}$ is detected when the movable portion 521 is positioned at either of the oscillation end points, but which light level corresponds to the oscillation endpoints is unknown. In this case, the controller 20 instructs the filter driver 21 to slightly change the drive voltage applied to the electrostatic actuator 56 (S10) and returns to the process in S2. The amount of change in the drive voltage is preferably set, for example, at a value smaller than the measurement interval set in S1. The light level detection pattern can therefore be changed to the pattern II or a pattern IV, the latter will be described later, by slightly changing the drive voltage, whereby a target light level can be acquired in S9 or S12, the latter will be described later. In general, when the spectroscopic measurement apparatus 1 measures a spectrum characteristic, light levels are acquired (measured) at the measurement intervals to create a spectrum curve, such as any of those shown in FIGS. 7, 11, and 15. In this case, even when the light level at part of the wavelength range is not acquired, a spectrum curve can be created by acquiring the light level at a wavelength in the vicinity of the part of the wavelength range, and the light level at a predetermined wavelength in the wavelength range under measurement can be estimated.

On the other hand, when the first light level $F_1$ and the second light level $F_2$ differ from each other (determined to be "No") in S6, the light level detection pattern corresponding to the oscillation of the movable portion 521 is either of those shown in FIGS. 9 and 16. In this case, the target light level acquisition unit 24 determines whether or not the third light level $F_3$ and the fourth light level $F_4$ are equal to each other (S11).

When the third light level $F_3$ and the fourth light level $F_4$ are determined to be equal to each other (determined to be "Yes") in S11, the light level detection pattern corresponding to the oscillation of the movable portion 521 is that shown in FIG. 9 (pattern IV).

The pattern IV means that the movable portion 521 is positioned at either of the oscillation end points at the timing when the minimum light level $F_{min}$ is detected, and that the maximum light level $F_{max}$ corresponds to a peak wavelength. The oscillation center of the movable portion 521 is therefore the position of the movable portion 521 at the time one-fourth the natural oscillation cycle $T_F$ before (or one-fourth the natural oscillation cycle $T_F$ after) the timing when the minimum light level $F_{min}$ corresponding to the oscillation end point is detected, and either of the third light level $F_3$ and the fourth light level $F_4$ is the target light level $F_c$. When the light level detection pattern is the pattern IV, the target light level acquisition unit 24 therefore acquires the third light level $F_3$ (=fourth light level $F_4$) as the target light level $F_c$ (S12).

On the other hand, when the third light level $F_3$ and the fourth light level $F_4$ are determined to differ from each other (determined to be "No") in S11, the light level detection pattern corresponding to the oscillation of the movable portion 521 is that shown in FIG. 16 (pattern V).

The pattern V means that the maximum light level $F_{max}$ or the minimum light level $F_{min}$ is detected at neither of the oscillation endpoints and that a peak wavelength corresponding to the maximum light level $F_{max}$ and a bottom wavelength corresponding to the minimum light level $F_{min}$ are present within the oscillation range.

When a peak wavelength and a bottom wavelength are present within the wavelength range as described above, the average of the light levels acquired during the period from the measurement start timing $T_2$ to the measurement stop timing $T_3$ substantially agrees with the light level corresponding to the oscillation center in many cases. The target light level acquisition unit 24 therefore calculates an average light level $F_{avr}$ based on the light levels acquired in S3 and the number of light level acquisition to acquire the average as the target light level $F_c$ (S13).

When a target light level is acquired in any of the processes in S9, S12, and S13, the controller 20 determines whether or not the measurement has been made on all target wavelengths within the wavelength range under measurement (S14).

When it is determined in S14 that no light level has been acquired at any of the wavelengths under measurement, arranged at the preset measurement interval, the control returns to the process in S1. On the other hand, when it is determined in S14 that the light level measurement has been made on all the wavelengths under measurement within the wavelength range under measurement, the spectroscopic measurement unit 25 performs spectroscopic measurement on the light under measurement based on the acquired light level at each of the wavelengths (S15).

Advantageous Effects Provided by Embodiment

The spectroscopic measurement apparatus 1 according to the present embodiment includes the wavelength tunable interference filter 5, the detector 11 that detects light having passed through the wavelength tunable interference filter 5, and the controller 20 that performs spectroscopic measurement based on the detected light levels. The wavelength tunable interference filter 5 includes the fixed substrate 51 having the fixed reflection film 54, the movable substrate 52 having the movable reflection film 55 facing the fixed reflection film 54, and the electrostatic actuator 56 that changes the inter-reflection-film gap G1. When the filter driver 21 in the controller 20 and the voltage control circuit 15 apply a drive voltage to the electrostatic actuator 56, the holding portion 522 of the movable substrate 52 is bent, and hence the movable portion 521 on which the movable reflection film 55 is provided is displaced toward the fixed substrate 51. In the thus configured wavelength tunable interference filter 5, which can transmit of light of a specific wavelength by changing the drive voltage, an elastic force produced by the holding portion 522 and an electrostatic attractive force produced by the electrostatic actuator 56 oscillate the movable portion 521. As a result, light of different wavelengths passes during the oscillation of the movable portion 521, and the light level detected by the detector 11 varies.

In the state described above, the controller 20 in the present embodiment instructs the detected light level acquisition unit 23 to acquire light levels detected by the detector 11 at predetermined intervals so as to acquire a light level transition state (light level detection pattern). The target light level acquisition unit 24 then acquires a target light level corresponding to the oscillation center of the movable portion 521 based on the light level detection pattern.

The target light level acquisition unit 24 in the present embodiment therefore does not need to wait until the oscillation of the movable portion 521 stops but can immediately acquire a target light level at a desired wavelength under measurement. The spectroscopic measurement apparatus 1 can therefore shorten a period required to acquire a light level at each wavelength under measurement, whereby a period required to measure the spectral characteristic of light under measurement can also be shortened.

In the present embodiment, the target light level acquisition unit 24 detects a maximum light level $F_{max}$ and a minimum light level $F_{min}$ based on the light level detection pattern and detects a first light level $F_1$ at the time one-fourth the natural oscillation cycle $T_F$ of the movable portion 521 before the timing when the maximum light level $F_{max}$ is acquired, a second light level $F_2$ at the time one-fourth the natural oscillation cycle $T_F$ after the timing when the maximum light level $F_{max}$ is acquired, a third light level $F_3$ at the time one-fourth the natural oscillation cycle $T_F$ before the timing when the minimum light level $F_{min}$ is acquired, and a fourth light level $F_4$ at the time one-fourth the natural oscillation cycle $T_F$ after the timing when the minimum light level $F_{min}$ is acquired. The target light level acquisition unit 24 then acquires a target light level $F_c$ based on whether the first light level $F_1$, the second light level $F_2$, the third light level $F_3$, and the fourth light level $F_4$ agree with each other.

In general, a maximum light level $F_{max}$ or a minimum light level $F_{min}$ is detected in many cases at the oscillation end points of the movable portion 521. When a maximum light level $F_{max}$ is detected at the oscillation end points, the first light level $F_1$ and the second light level $F_2$ are equal to each other and equal to a target light level $F_c$. When a minimum light level $F_{min}$ is detected at the oscillation end points, the third light level $F_3$ and the fourth light level $F_4$ are equal to each other. The target light level acquisition unit 24 can therefore readily acquire a target light level $F_c$ by determining whether the first light level $F_1$, the second light level $F_2$, the third light level $F_3$, and the fourth light level $F_4$ agree with each other, as described above. Further, measurement precision can be improved as compared with a method for acquiring a target light level by averaging light levels.

In the present embodiment, when a first light level $F_1$, a second light level $F_2$, a third light level $F_3$, and a fourth light level $F_4$ are equal to each other, the target light level acquisition unit 24 acquires the first light level $F_1$ as a target light level $F_c$.

The state in which the first light level $F_1$, the second light level $F_2$, the third light level $F_3$, and the fourth light level $F_4$ are equal to each other means that the light level detection pattern is the pattern I, in which a maximum light level $F_{max}$ or a minimum light level $F_{min}$ is detected at the oscillation end points. The target light level acquisition unit 24 can therefore readily and quickly acquire a target light level $F_c$ based on the light level detection pattern I by acquiring the light levels $F_1$, $F_2$, $F_3$, and $F_4$, which are equal to each other, as the target light level $F_c$, as described above.

In the present embodiment, when a first light level $F_1$ and a second light level $F_2$ are equal to each other and a third light level $F_3$ and a fourth light level $F_4$ differ from each other, the target light level acquisition unit 24 acquires the first light level $F_1$ as a target light level $F_c$. The state described above means that the light level detection pattern is the pattern II, in which a maximum light level $F_{max}$ is detected at one of the oscillation end points. The target light level acquisition unit 24 can therefore readily and quickly acquire a target light level $F_c$ based on the light level detection pattern II by acquiring the light levels $F_1$ and $F_2$, which are equal to each other, as the target light level $F_c$, as described above.

When a first light level $F_1$ and a second light level $F_2$ differ from each other and a third light level $F_3$ and a fourth light level $F_4$ are equal to each other, the target light level acquisition unit 24 acquires the third light level $F_3$ as a target light level $F_c$. The state described above means that the light level detection pattern is the pattern IV, in which a minimum light level $F_{min}$ is detected at one of the oscillation endpoints. The target light level acquisition unit 24 can therefore readily and quickly acquire a target light level $F_c$ based on the light level detection pattern IV by acquiring the light levels $F_3$ and $F_4$, which are equal to each other, as the target light level $F_c$, as described above.

In the present embodiment, when the target light level acquisition unit 24 determines that a first light level $F_1$ and a second light level $F_2$ are equal to each other, a third light level $F_3$ and a fourth light level $F_4$ are equal to each other, and the first light level $F_1$ and the third light level $F_3$ differ from each other, the filter driver 21 slightly changes the drive voltage applied to the electrostatic actuator 56.

That is, it is unclear in some cases whether the light level detection pattern is a pattern in which a maximum light level $F_{max}$ is detected at one of the oscillation end points and a minimum light level $F_{min}$ is detected at the oscillation center or a pattern in which a minimum light level $F_{min}$ is detected at one of the oscillation end points and a maximum light level $F_{max}$ is detected at the oscillation center, as in the case of the pattern III shown in FIGS. 10 and 14. Even in this case, in the present embodiment, the light level detection pattern can be changed to the pattern II or IV by slightly changing the drive voltage. In this case, light levels at wavelengths under measurement arranged at preset measurement intervals cannot be acquired, but light levels at wavelengths in the vicinity of the wavelengths under measurement can be acquired. The spectroscopic measurement unit 25 then measures a spectral characteristic of the light under measurement in accordance with the light level acquired at each wavelength. Therefore, even when no light levels at the wavelengths under measurement arranged at the measurement intervals can be acquired, the spectral characteristic of the light under measurement can be measured by acquiring the light levels at the wavelengths in the vicinity of the wavelengths under measurement. Further, unmeasured light levels at the wavelengths under measurement can be estimated from the spectral characteristic measured by the spectroscopic measurement unit 25.

In the present embodiment, when a first light level $F_1$, a second light level $F_2$, a third light level $F_3$, and a fourth light level $F_4$ differ from one another, the target light level acquisition unit 24 acquires the average $F_{avr}$ of light levels acquired by the detected light level acquisition unit 23 as a target light level $F_c$.

The state in which a first light level $F_1$, a second light level $F_2$, a third light level $F_3$, and a fourth light level $F_4$ differ from one another means that the oscillation end points do not correspond to a maximum light level $F_{max}$ or a minimum light level $F_{min}$ but that a peak wavelength corresponding to the maximum light level $F_{max}$ and a bottom wavelength corresponding to the minimum light level $F_{min}$ are present within a wavelength range corresponding to the oscillation range of the movable portion 521 (pattern V). When a peak wavelength and a bottom wavelength are present within the wavelength range corresponding to the oscillation range as described above, the oscillation center is present between the peak wavelength and the bottom wavelength in many cases, and the light level at the oscillation center substantially agrees with the average of light levels. The target light level acquisition unit 24 can therefore readily acquire a target light level $F_c$ based on the light level detection pattern V by acquiring the average of light levels as the target light level $F_c$, as described above.

Second Embodiment

A second embodiment of the invention will next be described below. A spectroscopic measurement apparatus according to the present embodiment has a configuration similar to that of the spectroscopic measurement apparatus 1 according to the first embodiment shown in FIG. 1 and only differs therefrom in part of the processes performed by the target light level acquisition unit 24. The present embodiment will therefore be described below with reference to FIG. 1, and the components described in the first embodiment will not be described.

In the first embodiment described above, when a first light level and a second light level are equal to each other, a third light level and a fourth light level are equal to each other, and the first light level and the third light level differ from each other (when the determination result in S8 in FIG. 6 is "No" and shows that the light level detection pattern is the pattern III shown in FIGS. 10 and 14), the target light level acquisition unit 24 slightly changes the drive voltage applied to the electrostatic actuator 56 in the wavelength tunable interference filter 5 and acquires a target light level corresponding to the thus newly set drive voltage. In contrast, the present embodiment differs from the first embodiment in that based on how the light level transitions when the drive voltage is slightly changed, the light level detection pattern before the voltage is changed is identified and a target light level before the voltage is changed is acquired.

That is, in the present embodiment, when the target light level acquisition unit 24 outputs the "No" determination result in S8 in FIG. 6, the filter driver 21 carries out the process in S10 to slightly change the drive voltage as in the first embodiment. Now, let a first voltage be the drive voltage before the voltage is changed and a second voltage be the drive voltage after the voltage is changed.

When the drive voltage is changed as described above, the range A3 shown in FIG. 7 and the range A6 shown in FIG. 11 are changed to the ranges A2 and A5 respectively, and the light level detection pattern III shown in FIGS. 10 and 14 is changed to the light level detection pattern II or VI shown in FIG. 13 or 9, respectively. The state in which the light level detection pattern is changed to the pattern II shown in FIG. 13 when the second voltage is applied means that the light level detection pattern is the pattern shown in FIG. 14 when the first voltage is applied and that a peak wavelength is detected at the oscillation center. On the other hand, the state in which the light level detection pattern is changed to the pattern IV shown in FIG. 9 when the second voltage is applied means that the light level detection pattern is the pattern shown in FIG. 10 when the first voltage is applied and that a bottom wavelength is detected at the oscillation center.

The target light level acquisition unit 24 in the present embodiment therefore, after S10 in FIG. 6 and when a third light level $F_3$ and a fourth light level $F_4$ are equal to each other and a first light level $F_1$ and a second light level $F_2$ differ from each other, acquires a maximum light level $F_{max}$ (=third light level $F_3$=fourth light level $F_4$) as a target light level corresponding to the drive voltage before it is changed (first voltage). On the other hand, the target light level acquisition unit 24, after S10 in FIG. 6 and when a first light level $F_1$ and a second light level $F_2$ are equal to each other and a third light level $F_3$ and a fourth light level $F_4$ differ from each other, acquires a minimum light level $F_{min}$ (=first light level $F_1$=second light level $F_2$) as a target light level corresponding to the drive voltage before it is changed (first voltage).

Advantageous Effects Provided by Present Embodiment

In the present embodiment, when the target light level acquisition unit 24 determines that a first light level $F_1$ and a second light level $F_2$ are equal to each other, a third light level $F_3$ and a fourth light level $F_4$ are equal to each other, and the first light level $F_1$ and the third light level $F_3$ differ from each other, the filter driver 21 slightly changes the drive voltage applied to the electrostatic actuator 56. That is, the filter driver 21 switches the voltage applied to the electrostatic actuator 56 from the first voltage to the second voltage. As a result, the detection pattern, such as the pattern III, can be changed to the light level detection pattern II or IV, as in the first embodiment described above.

In the present embodiment, the state in which the second voltage is applied and the light level detection pattern is changed to the pattern II means that a minimum light level $F_{min}$ corresponding to a bottom wavelength is detected at the oscillation center. The target light level acquisition unit 24 therefore acquires the minimum light level $F_{min}$ (=first light level $F_1$=second light level $F_2$) as a target light level at a target wavelength corresponding to the first voltage. On the other hand, the state in which the second voltage is applied and the light level detection pattern is changed to the pattern IV means that a maximum light level $F_{max}$ corresponding to a peak wavelength is detected at the oscillation center. The target light level acquisition unit 24 therefore acquires the maximum light level $F_{max}$ (=third light level $F_3$=fourth light level $F_4$) as a target light level at a target wavelength corresponding to the first voltage.

The target light level acquisition unit 24 can thus quickly acquire a target light level $F_c$ without waiting until the oscillation of the movable portion 521 stops.

Third Embodiment

A third embodiment of the invention will next be described below.

In the first and second embodiments described above, the detected light level acquisition unit 23 acquires light levels, from which a maximum light level, a minimum light level, and first to fourth light levels are detected, and a target light level is acquired based on whether the first to fourth light levels agree with each other. In contrast, the present embodiment differs from the first and second embodiments described above in that a light level detection pattern acquired by the detected light level acquisition unit is used to determine extreme values and the periodicity thereof, based on which a target light level is acquired.

Figure 17:
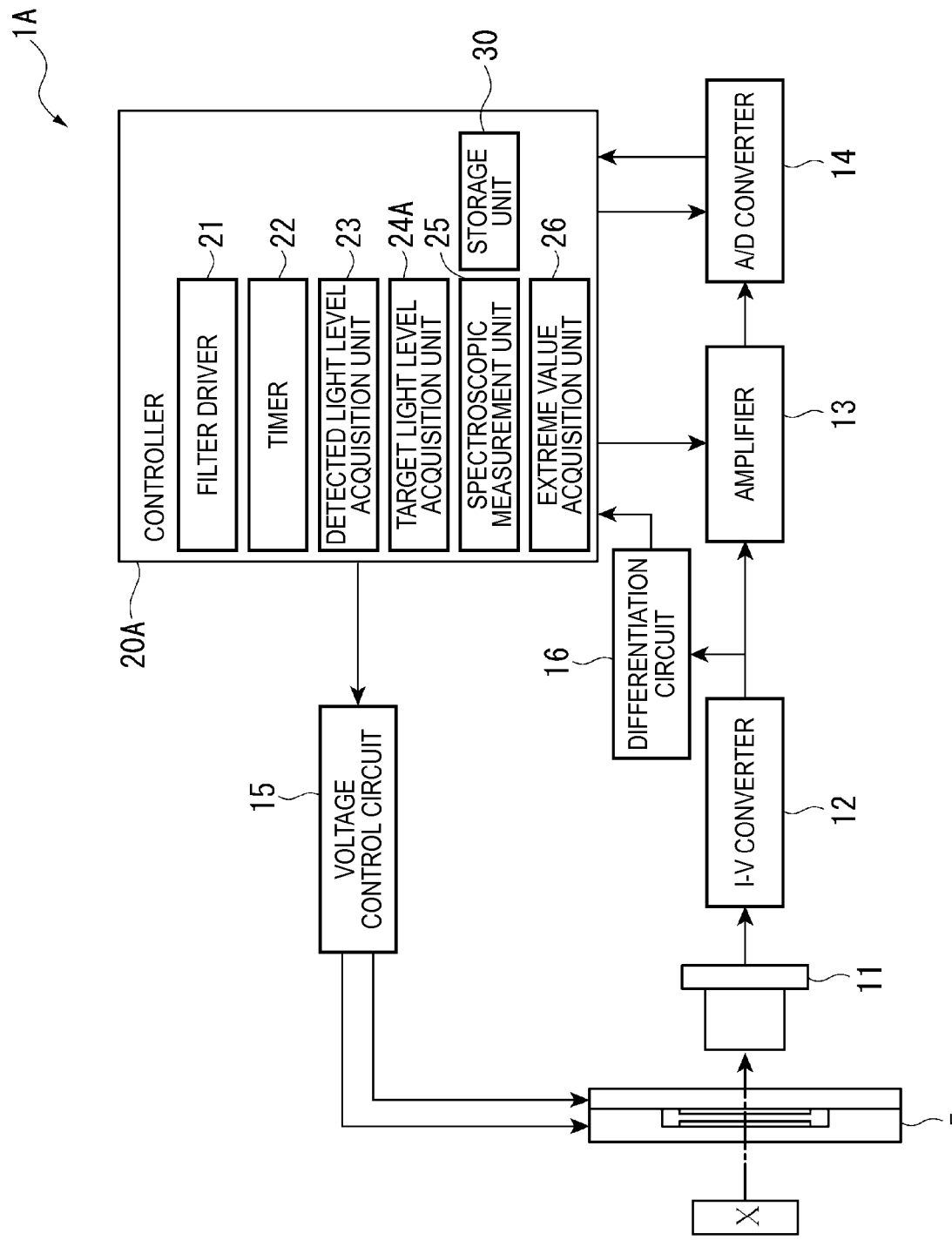
FIG. 17 is a block diagram showing a schematic configuration of a spectroscopic measurement apparatus according to a third embodiment.

FIG. 17 shows a schematic configuration of a spectroscopic measurement apparatus 1A according to the third embodiment. In the description of the present embodiment, the same components as those in the first and second embodiments have the same reference characters, and the description thereof will be omitted or simplified.

In the spectroscopic measurement apparatus 1A according to the present embodiment, a detection signal (current) outputted from the detector 11 is converted into a voltage by the I-V converter 12, as shown in FIG. 17. The detection signal (voltage) outputted from the I-V converter 12 is delivered to the amplifier 13 and a differentiation circuit 16. The detection signal outputted to the amplifier 13 is delivered through the A/D converter 14 to a controller 20A, as in the first embodiment.

On the other hand, the detection signal outputted to the differentiation circuit 16 is differentiated therein and outputted to the controller 20A. When the detection signal is differentiated by the differentiation circuit 16 as described above, local maximum light levels and local minimum light levels in a light level detection pattern can be acquired. The controller 20A in the present embodiment includes the filter driver 21, the timer 22, the detected light level acquisition unit 23, a target light level acquisition unit 24A, the spectroscopic measurement unit 25, an extreme value acquisition unit 26, and the storage unit 30, as shown in FIG. 17.

The extreme value acquisition unit 26 detects local maximums (local maximum light levels $F_b$), local minimums (local minimum light levels $F_s$), and extreme value acquisition timings at which the extreme values are acquired from light levels acquired during the oscillation of the movable portion 521 based on the signal inputted from the differentiation circuit 16.

The target light level acquisition unit 24A acquires a target light level $F_c$ based on light levels acquired by the detected light level acquisition unit 23, extreme values detected by the extreme value acquisition unit 26, and the extreme value acquisition timings at which the extreme values are acquired. That is, consider a case where the movable portion 521 oscillates within an oscillation range and the light level detected by the detector 11 over the oscillation range varies. In this state, when the movable portion 521 is positioned at one of the oscillation endpoints, either a local maximum light level $F_b$ or a local minimum light level $F_s$ is acquired, and substantially the same values are acquired in the natural oscillation cycle $T_b$. The target light level acquisition unit 24A can therefore detect the timing at which the movable portion 521 is positioned at one of the oscillation end points based on the extreme values and the periodicity thereof and acquire a target light level $F_c$ corresponding to the oscillation center. A specific method for acquiring a target light level by using the target light level acquisition unit 24A will be described later.

Spectroscopic Measurement Method

A spectroscopic measurement method used with the spectroscopic measurement apparatus 1A according to the present embodiment will be described below with reference to the drawings.

Figure 18:
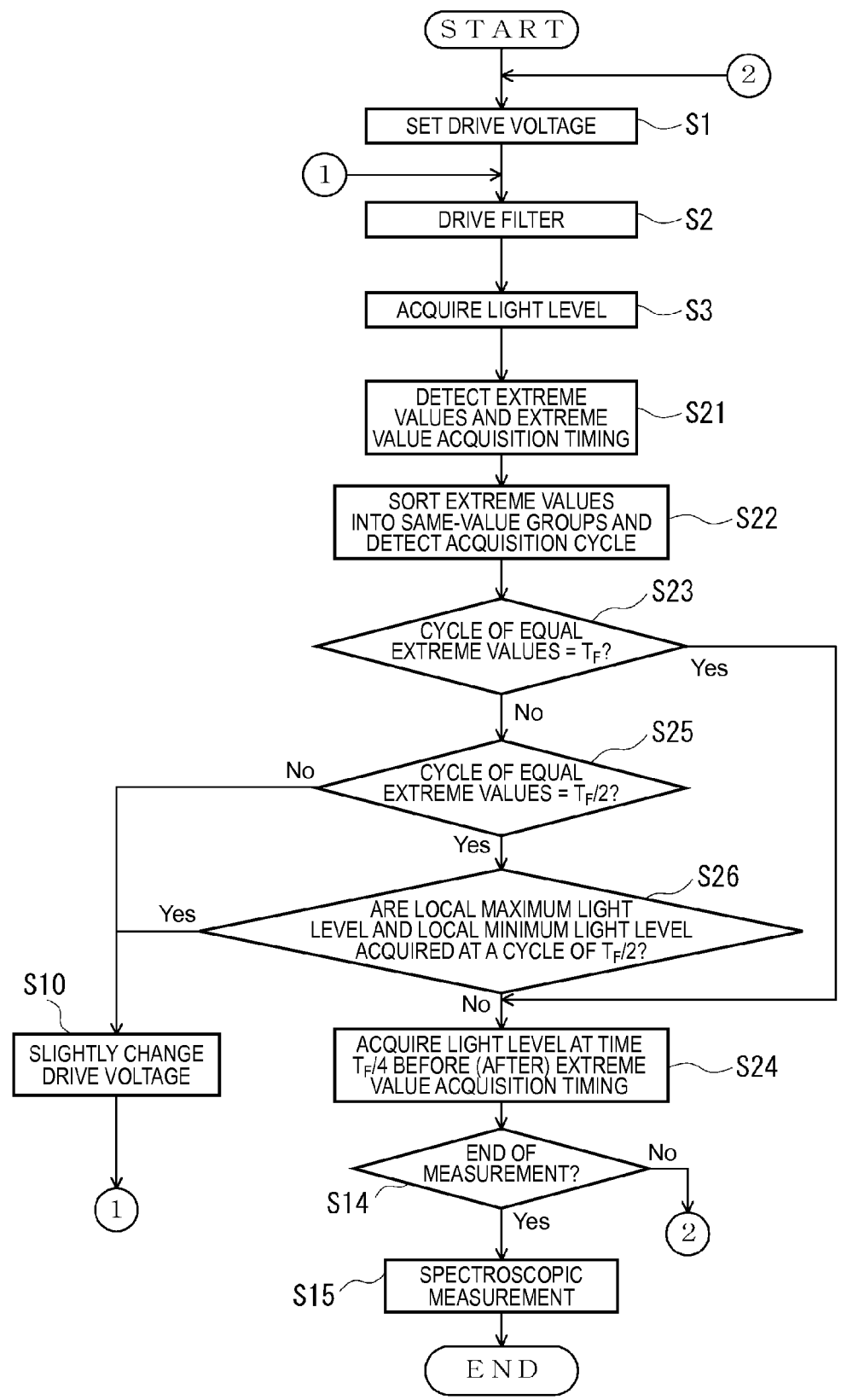
FIG. 18 is a flowchart of a spectroscopic measurement method used with the spectroscopic measurement apparatus according to the third embodiment.

FIG. 18 is a flowchart showing the spectroscopic measurement method according to the present embodiment.

In the spectroscopic measurement method used with the spectroscopic measurement apparatus 1A according to the present embodiment, after measurement starts, the process in S1 is first carried out, that is, the filter driver 21 refers to the V-λ, data stored in the storage unit 30 and sets a drive voltage applied to the electrostatic actuator 56 in the wavelength tunable interference filter 5 as shown in FIG. 18, as in the first embodiment. The process in S2 is then carried out, that is, the filter driver 21 controls the voltage control circuit 15 to drive the electrostatic actuator 56 in the wavelength tunable interference filter 5 by applying the set drive voltage thereto. The movable portion 521 in the wavelength tunable interference filter 5 is thus displaced toward the fixed substrate 51. At this point, an electrostatic attractive force produced by the electrostatic actuator 56 and an elastic force produced by the holding portion 522 act on the movable portion 521, which oscillates up and down with respect to the oscillation center at a predetermined natural oscillation cycle, as described above. Further, the timer 22 starts counting an elapsed period upon the drive voltage application of the filter driver 21 to the electrostatic actuator 56.

The detected light level acquisition unit 23 then acquires light levels detected by the detector 11 in a period from the measurement start timing $T_2$ to the measurement stop timing $T_3$ based on the elapsed period counted by the timer 22, as in S2 in the first embodiment.

Further, simultaneously with the light level acquisition of the detected light level acquisition unit 23, the extreme value acquisition unit 26 detects extreme values (local maximum light level $F_b$ and local minimum light level $F_s$) and the extreme value acquisition timings at which the extreme values are acquired (S21).

Figure 19:
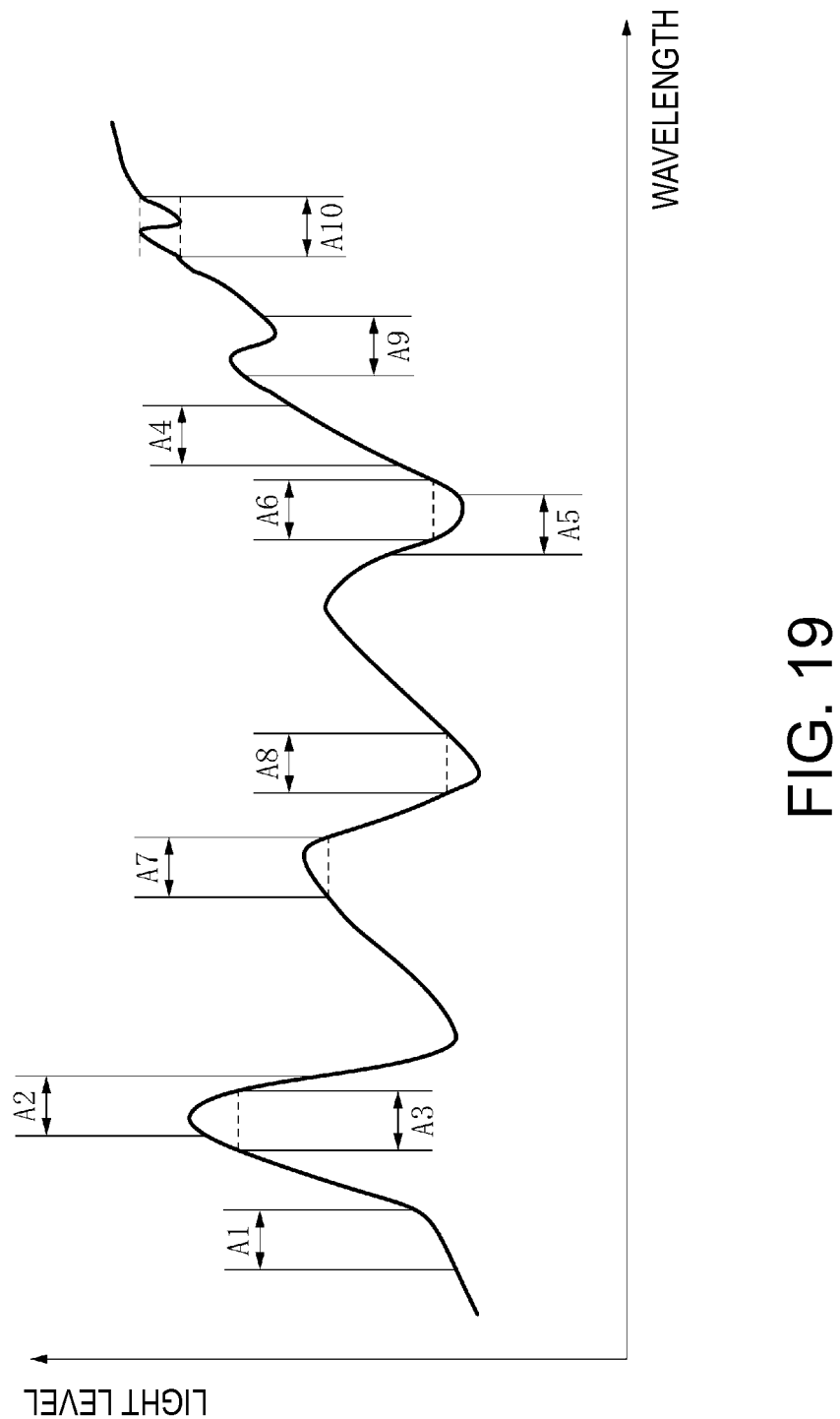
FIG. 19 shows an example of a spectral characteristic of light under measurement and examples of an oscillation range of the movable portion.

FIG. 19 shows an example of light under measurement. In FIG. 19, ranges A1 to A10 represent examples of an oscillation range of the movable portion 521.

Figure 20:
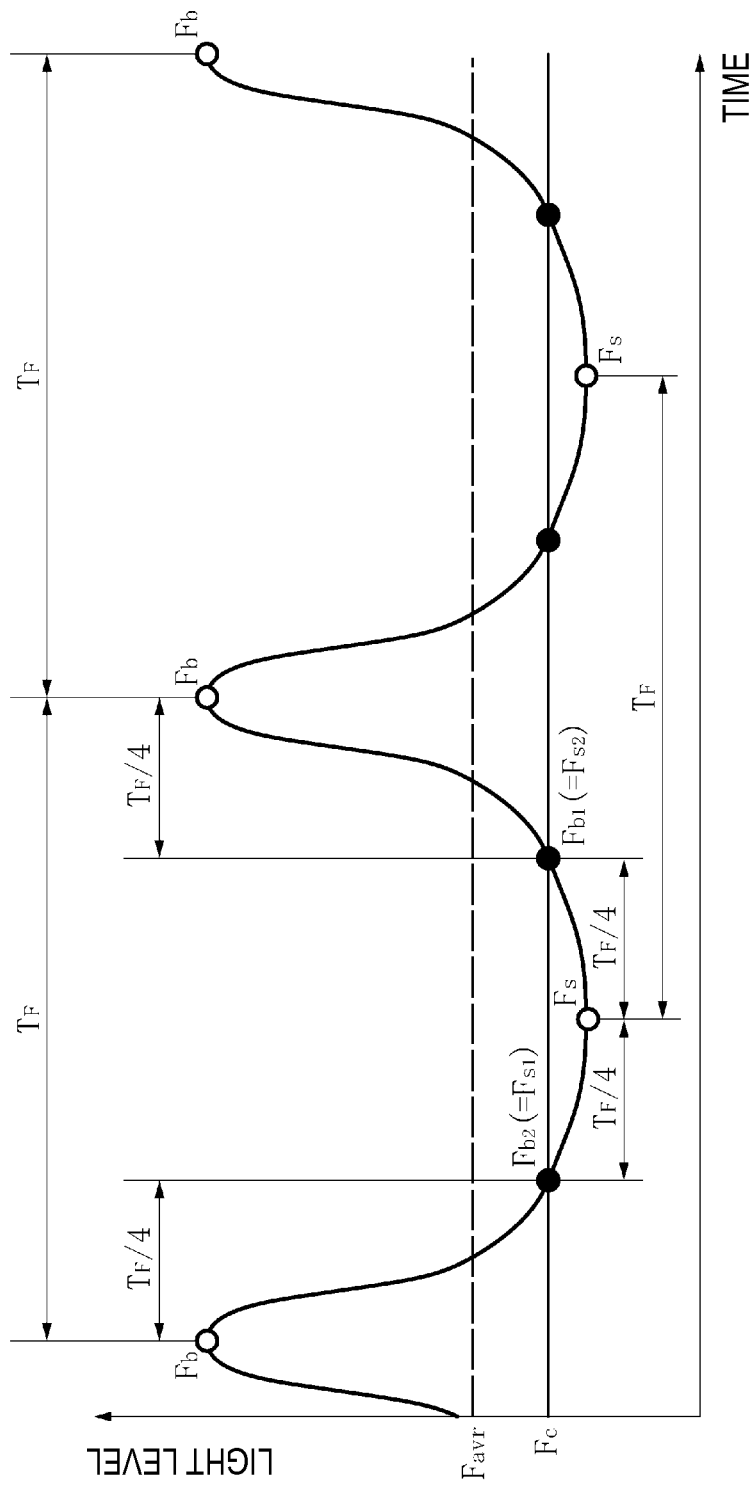
FIG. 20 shows a detected light level versus time within a range A1 shown in FIG. 19 (light level detection pattern).
Figure 21:
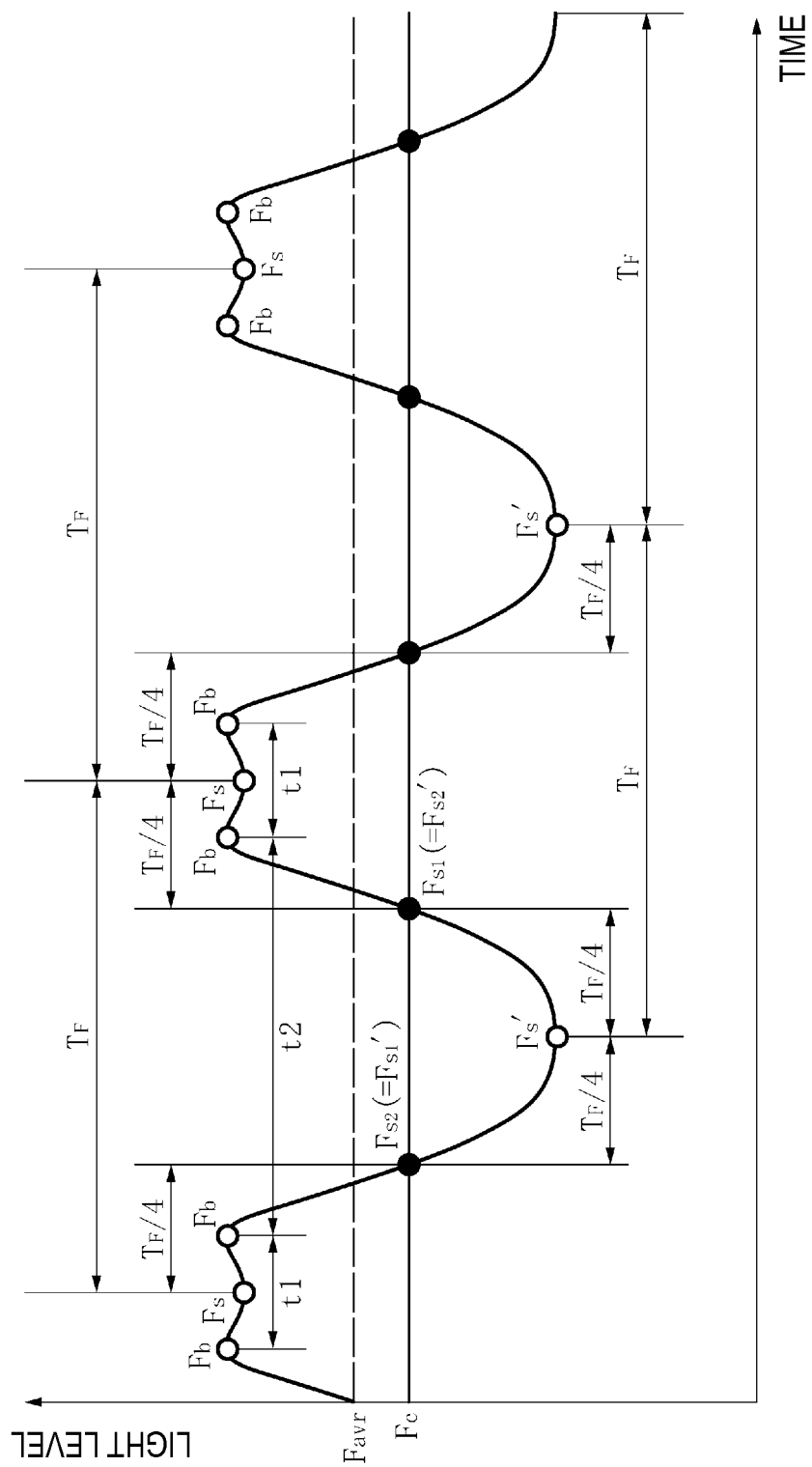
FIG. 21 shows a detected light level versus time within a range A2 shown in FIG. 19 (light level detection pattern).
Figure 22:
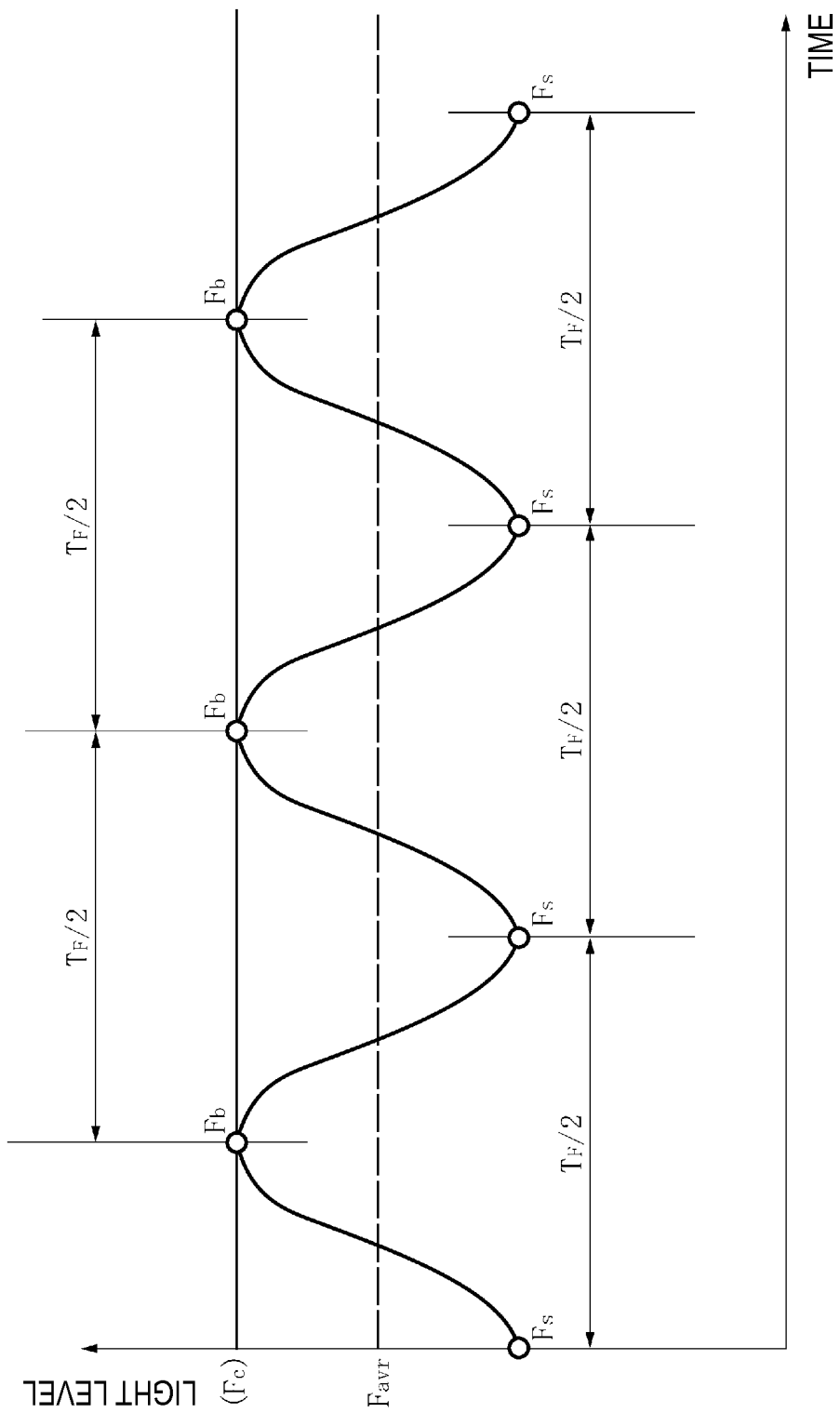
FIG. 22 shows a detected light level versus time within a range A3 shown in FIG. 19 (light level detection pattern).
Figure 23:
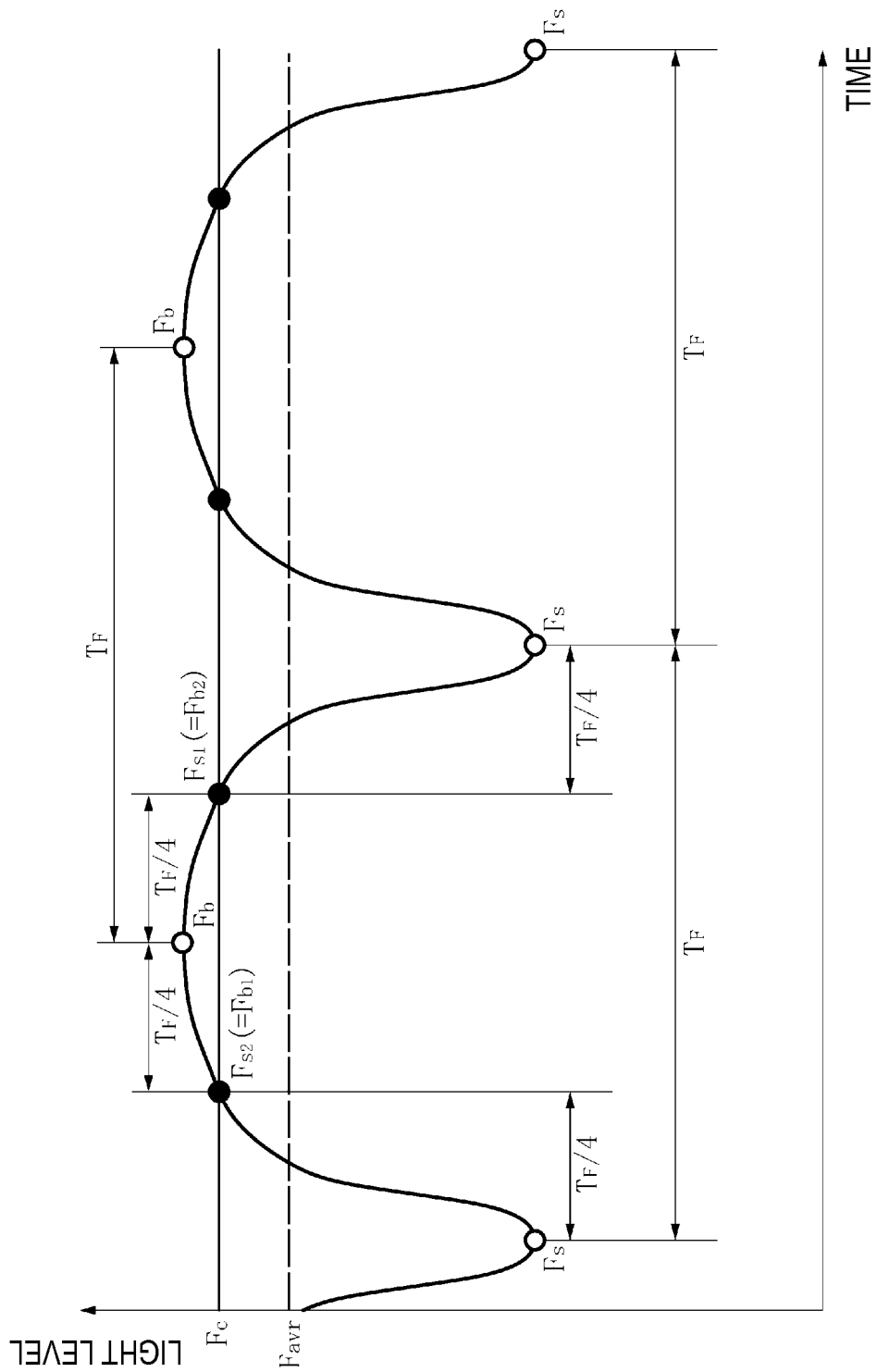
FIG. 23 shows a detected light level versus time within a range A4 shown in FIG. 19 (light level detection pattern).
Figure 24:
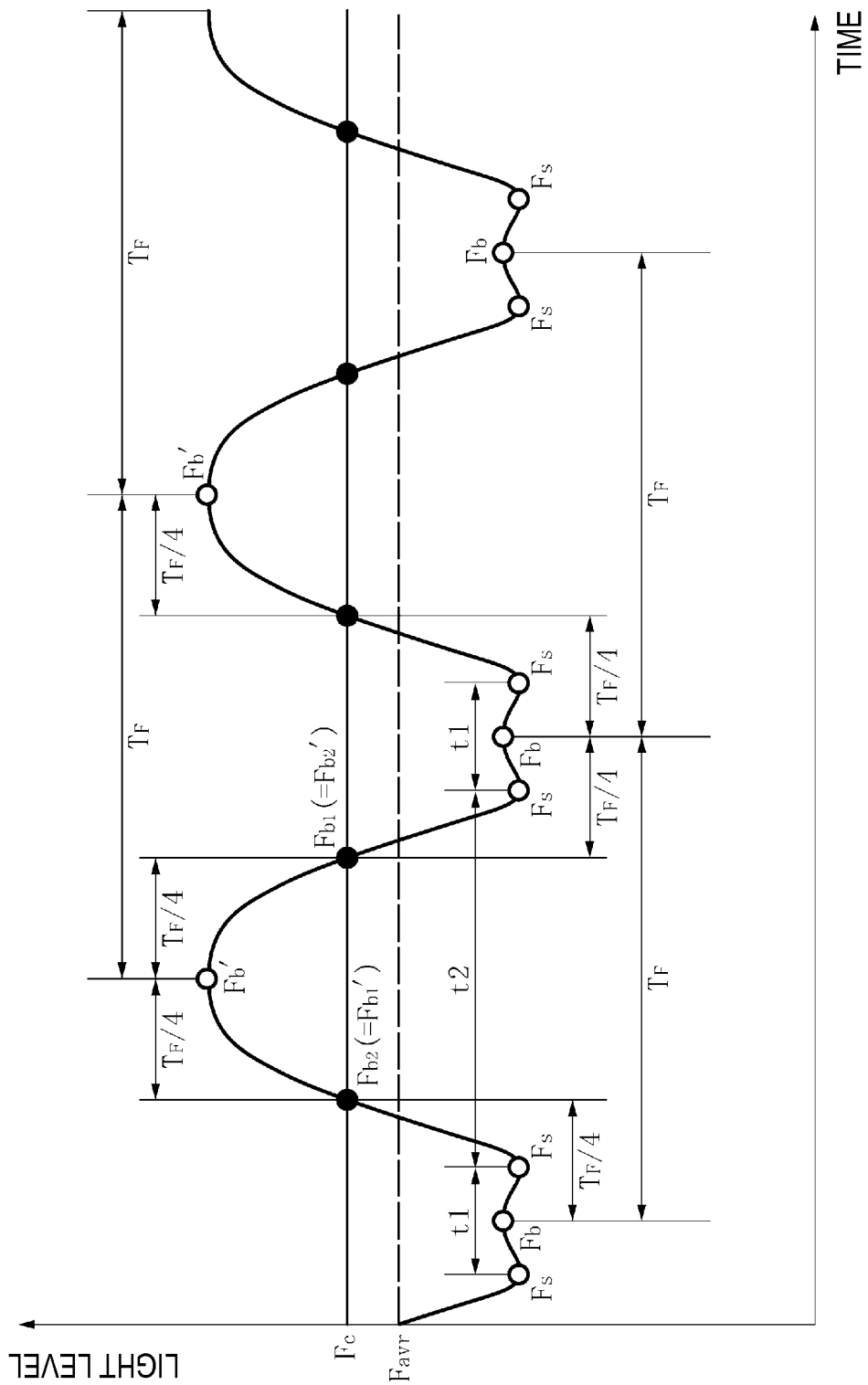
FIG. 24 shows a detected light level versus time within a range A5 shown in FIG. 19 (light level detection pattern).
Figure 25:
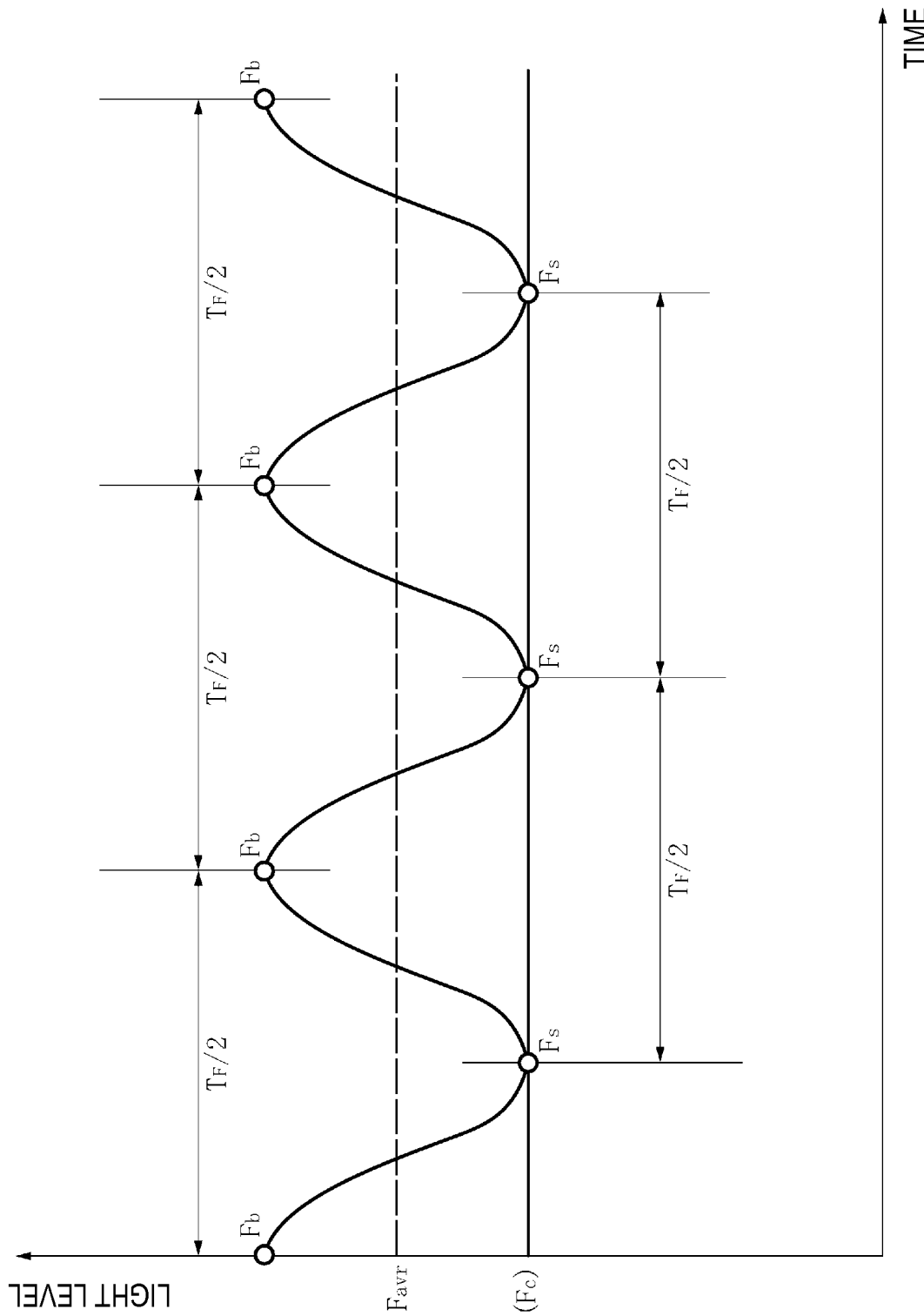
FIG. 25 shows a detected light level versus time within a range A6 shown in FIG. 19 (light level detection pattern).
Figure 26:
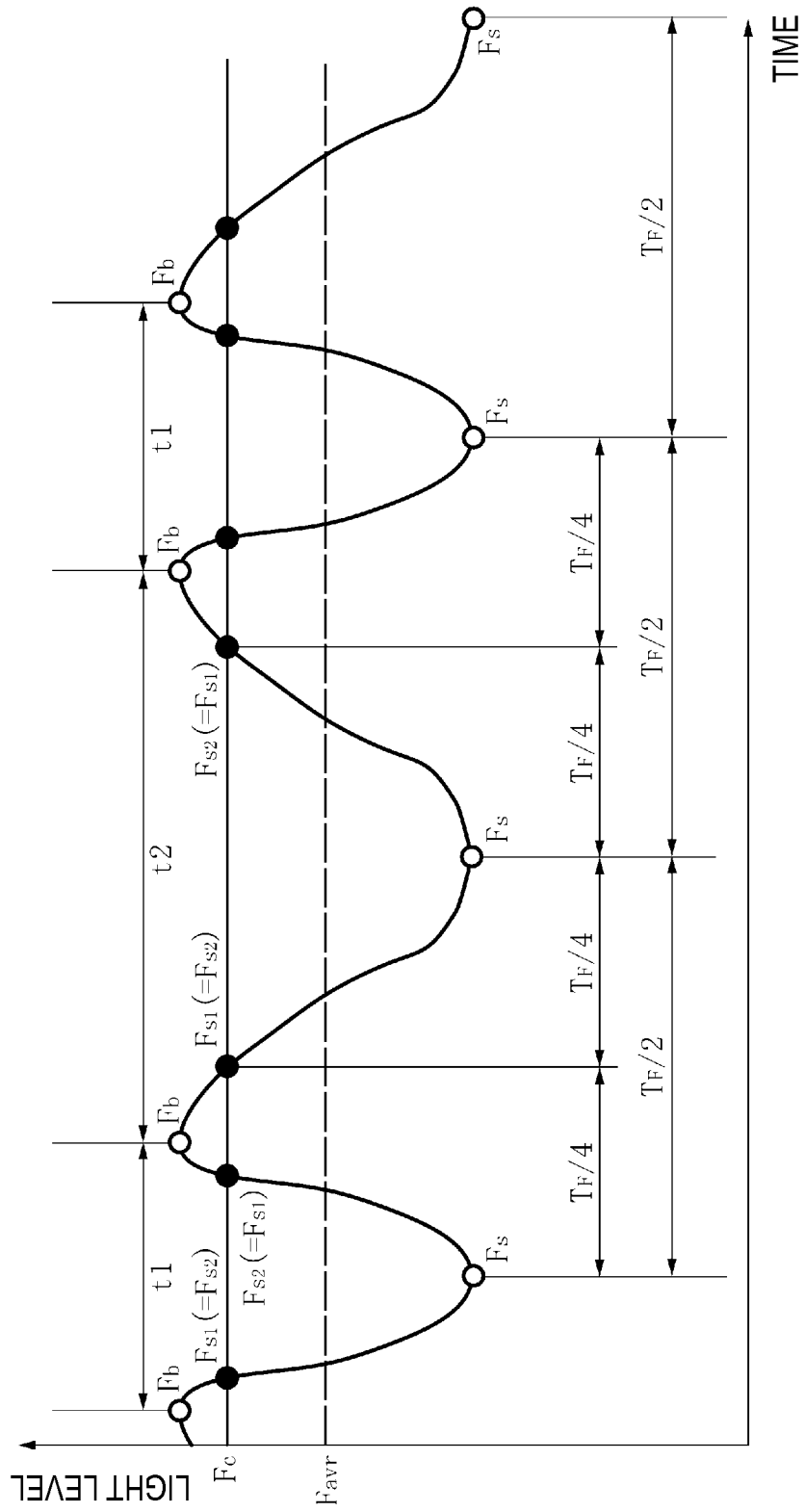
FIG. 26 shows a detected light level versus time within a range A7 shown in FIG. 19 (light level detection pattern).
Figure 27:
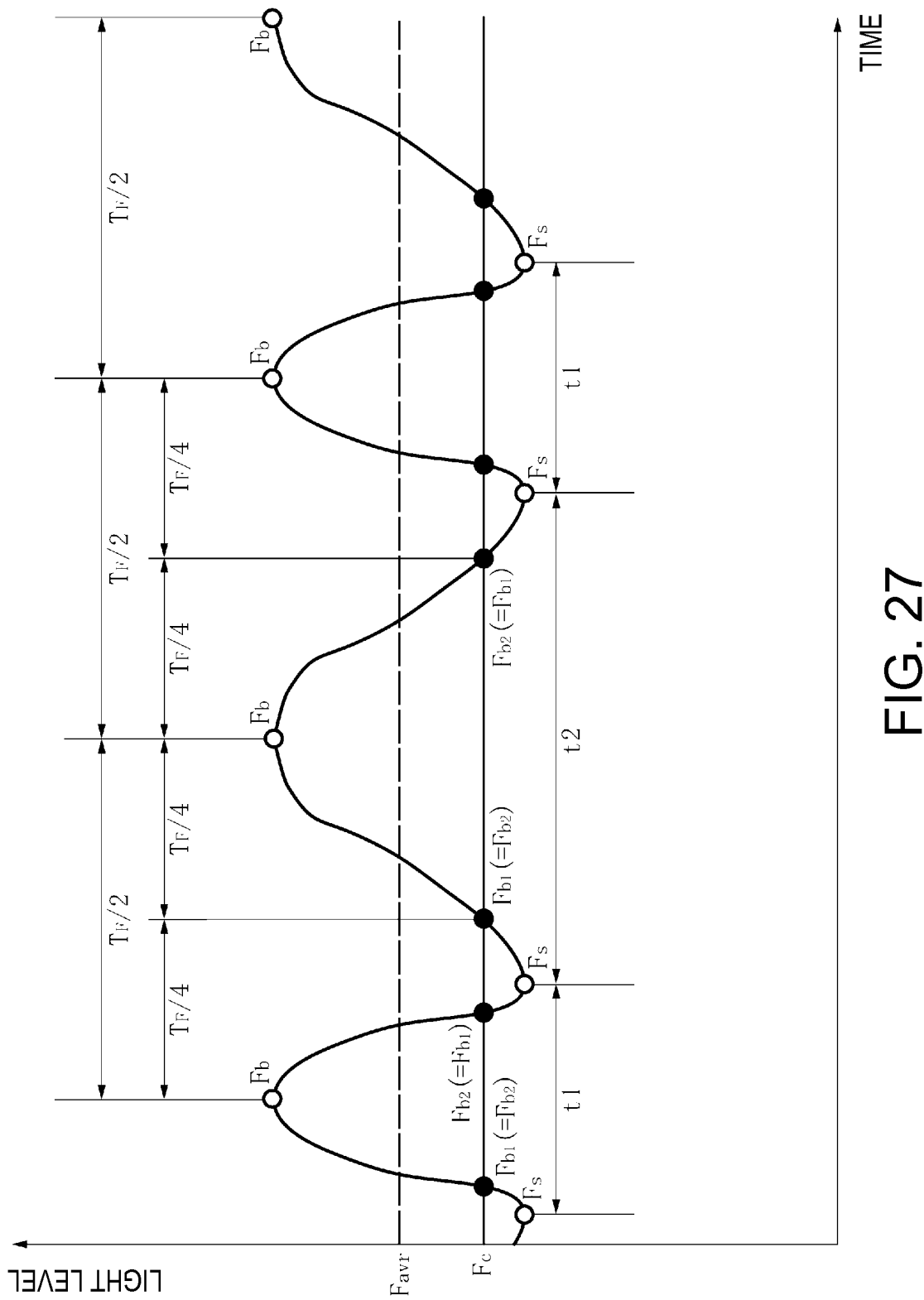
FIG. 27 shows a detected light level versus time within a range A8 shown in FIG. 19 (light level detection pattern).
Figure 28:
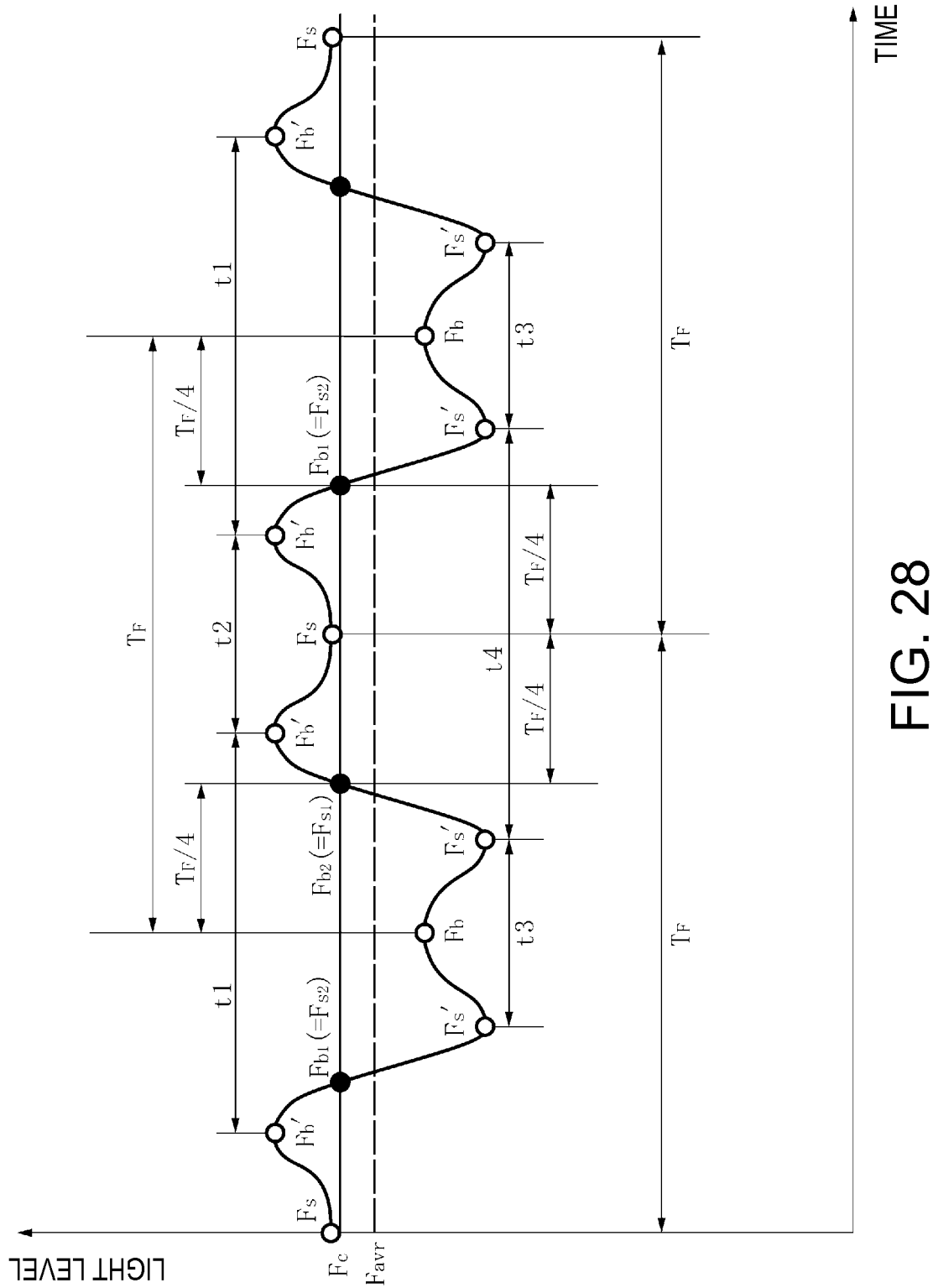
FIG. 28 shows a detected light level versus time within a range A9 shown in FIG. 19 (light level detection pattern).
Figure 29:
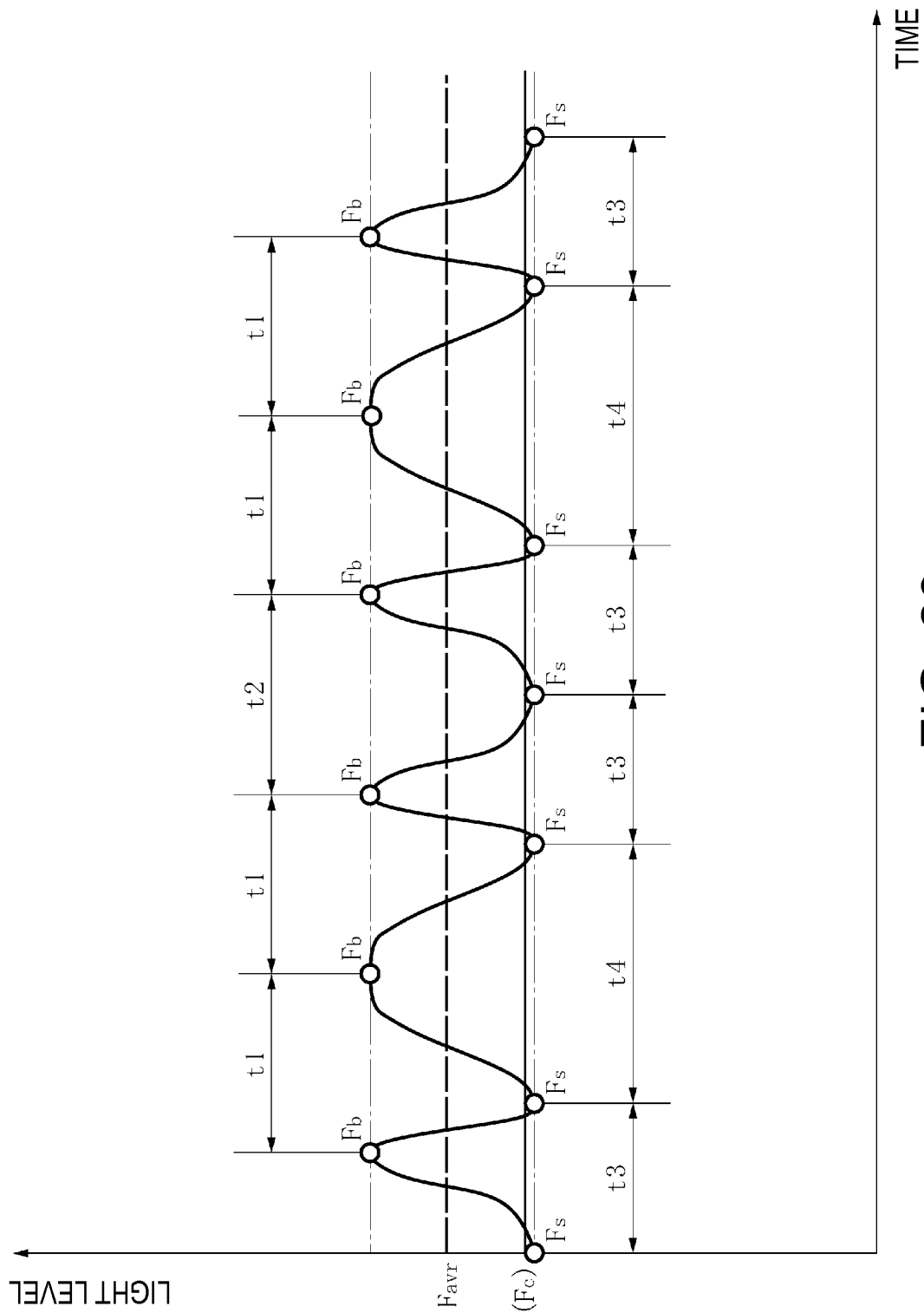
FIG. 29 shows a detected light level versus time within a range A10 shown in FIG. 19 (light level detection pattern).

FIGS. 20 to 29 show light levels detected in the ranges A1 to A10 versus the time at which each of the light levels is acquired (light level detection pattern). FIG. 20 corresponds to the range A1. FIG. 21 corresponds to the range A2. FIG. 22 corresponds to the range A3. FIG. 23 corresponds to the range A4. FIG. 24 corresponds to the range A5. FIG. 25 corresponds to the range A6. FIG. 26 corresponds to the range A7. FIG. 27 corresponds to the range A8. FIG. 28 corresponds to the range A9. FIG. 29 corresponds to the range A10.

After S3 and S21, the target light level acquisition unit 24A sorts the acquired extreme value $F_b$ and $F_c$ into same-value groups and detects the cycle of the extreme value acquisition timing at which the same extreme value is detected in each of the groups (S22).

The target light level acquisition unit 24A then determines whether or not any of the groups includes equal extreme values that appear in the natural oscillation cycle $T_F$ of the movable portion 521 (S23). That is, the target light level acquisition unit 24A determines whether or not the light level detection pattern is a pattern in which equal local maximum light levels $F_b$ are detected in the cycle $T_F$ or a pattern in which equal local minimum light levels $F_s$ are detected in the cycle $T_F$.

When the cycle of the extreme value acquisition timing at which equal extreme values are acquired is determined to be the natural oscillation cycle $T_F$ (determined to be "Yes") in S23, the light level detection pattern corresponding to the oscillation of the movable portion 521 is any of those shown in FIGS. 20, 21, 23, 24, and 28.

The state in which the light level detection pattern is either of those shown in FIGS. 20 and 23 means that no peak wavelength or bottom wavelength is present in the wavelength range under measurement corresponding to the oscillation range of the movable portion 521, as indicated by the ranges A1 and A4 shown in FIG. 19.

In this case, a local maximum light level $F_b$ is detected with the movable portion 521 positioned at one of the oscillation end points, and a local minimum light level $F_s$ is detected with the movable portion 521 positioned at the other oscillation end point. The light level detected with the movable portion 521 positioned at the oscillation center is a light level $F_{b1}$ ($=F_{b2}=F_{s1}=F_{s2}$) detected at the time one-fourth the natural oscillation cycle $T_F$ before (or one-fourth the natural oscillation cycle $T_F$ after) the extreme value acquisition timing at which the local maximum light level $F_b$ (local minimum light level $F_s$) is detected.

It is noted in FIGS. 20 to 29 that $F_{b1}$ represents the light level at the time one-fourth the natural oscillation cycle $T_F$ before the extreme value acquisition timing at which a local maximum light level $F_b$ is acquired, $F_{b2}$ represents the light level at the time one-fourth the natural oscillation cycle $T_F$ after the extreme value acquisition timing at which a local maximum light level $F_b$ is acquired, $F_{s1}$ represents the light level at the time one-fourth the natural oscillation cycle $T_F$ before the extreme value acquisition timing at which a local minimum light level $F_s$ is acquired, and $F_{s2}$ represents the light level at the time one-fourth the natural oscillation cycle $T_F$ after the extreme value acquisition timing at which a local minimum light level $F_s$ is acquired.

The light level detection patterns shown in FIGS. 21 and 24 mean that a peak wavelength or a bottom wavelength is present in the wavelength range under measurement corresponding to the oscillation range of the movable portion 521, as indicated by the ranges A2 and A5 shown in FIG. 19, and that different light levels are detected at the oscillation endpoints of the movable portion 521.

In this case, for example, in FIG. 21, a local maximum light level $F_b$ is acquired in correspondence with a peak wavelength, and the cycle of the extreme value acquisition timing at which the local maximum light level $F_b$ is acquired is a combination of a cycle t1 and a cycle t2 ($T_F$=t1+t2, t1≠t2). Similarly, in FIG. 24, a local minimum light level $F_s$ is acquired in correspondence with a bottom wavelength, and the cycle of the extreme value acquisition timing at which the local minimum light level $F_s$ is acquired is a combination of a cycle t1 and a cycle t2 ($T_F$=t1+t2, t1≠t2). That is, the cycle of the extreme value acquisition timing at which the local maximum light level $F_b$ is acquired in FIG. 21 and the cycle of the extreme value acquisition timing at which the local minimum light level $F_s$ is acquired in FIG. 24 are not the natural oscillation cycle $T_F$ of the movable portion 521 or one-half the natural oscillation cycle $T_F$, and hence light levels corresponding to the oscillation end points of the movable portion 521 are not provided.

On the other hand, two local minimum light levels $F_s$ and $F_s'$ are acquired in the light level detection pattern shown in FIG. 21, whereas two local maximum light levels $F_b$ and $F_b'$ are acquired in the light level detection pattern shown in FIG. 24. Each of the extreme values is detected in the natural oscillation cycle $T_F$. The state in which equal extreme values are detected in the natural oscillation cycle $T_F$ of the movable portion 521 as described above means that the extreme values are detected at the oscillation end points of the movable portion 521. The light level detected with the movable portion 521 positioned at the oscillation center is a light level $F_{b1}$ (=$F_{b2}$=$F_{b1}'$=$F_{b2}'$ in light level detection pattern shown in FIG. 21) or $F_{s1}$ (=$F_{s2}$=$F_{s1}'$=$F_{s2}'$ in light level detection pattern shown in FIG. 24) detected at the time one-fourth the natural oscillation cycle $T_F$ before (or one-fourth the natural oscillation cycle $T_F$ after) the extreme value detection timings at which the extreme values are detected in the natural oscillation cycle $T_F$.

The light level detection pattern shown in FIG. 28 means that a peak wavelength and a bottom wavelength are present in the wavelength range under measurement corresponding to the oscillation range of the movable portion 521, as indicated by the range A9 shown in FIG. 19, and that different light levels are detected at the oscillation end points of the movable portion 521.

In this case, a local maximum light level $F_b'$ is acquired in correspondence with the peak wavelength and a local minimum light level $F_s'$ is acquired in correspondence with the bottom wavelength, but the cycle of the extreme value acquisition timing at which the local maximum light level $F_b'$ is acquired is a combination of a cycle t1 and a cycle t2 (the cycle of the extreme value acquisition timing at which the local minimum light level $F_s'$ is acquired is a combination of a cycle t3 and a cycle t4) ($T_F$=t1+t2=t3+t4, t1≠t2, t3≠t4). That is, the cycle of the local maximum light level $F_b'$ and the cycle of the local minimum light level $F_s'$ are not the natural oscillation cycle $T_F$ of the movable portion 521 or one-half the natural oscillation cycle $T_F$, and hence light levels corresponding to the oscillation end points of the movable portion 521 are not provided.

On the other hand, when the light level detection pattern is that shown in FIG. 28, a local maximum light level $F_b$ and a local minimum light level $F_s$ that differ from extreme values $F_b'$ and $F_s'$ are acquired, and each of the extreme values $F_b$ and $F_s$ is detected in the natural oscillation cycle $T_F$, which means that the extreme values are detected at the oscillation end points of the movable portion 521. The light level detected with the movable portion 521 positioned at the oscillation center is therefore a light level $F_{b1}$ (=$F_{b2}$=$F_{s1}$=$F_{s2}$) detected at the time one-fourth the natural oscillation cycle $T_F$ before (or one-fourth the natural oscillation cycle $T_F$ after) the extreme value acquisition timing at which the extreme values are detected in the natural oscillation cycle $T_F$.

As described above, when equal extreme values are acquired in the natural oscillation cycle $T_F$, the extreme values are the light level corresponding to one of the oscillation endpoints of the movable portion 521. Therefore, when the determination result in S23 is "Yes," the target light level acquisition unit 24A acquires, as a target light level $F_c$, the light level detected at the time the one-fourth the natural oscillation cycle $T_F$ before (or one-fourth the natural oscillation cycle $T_F$ after) the extreme value acquisition timing at which an extreme value $F_b$ ($F_s$) is acquired in the natural oscillation cycle $T_F$ (S24).

When the determination result in S23 is "No," that is, when equal extreme values are not acquired in the natural oscillation cycle $T_F$, the target light level acquisition unit 24A determines whether or not the equal extreme values are acquired in one-half the natural oscillation cycle $T_F$ (S25). When it is determined in S25 that the equal extreme values are acquired in one-half the natural oscillation cycle $T_F$ (determined to be "Yes"), the light level detection pattern corresponding to the oscillation of the movable portion 521 is any of those shown in FIGS. 22, 25, 26, and 27. In this case, the target light level acquisition unit 24A determines whether or not each of the cycle of the extreme value acquisition timing at which the local maximum light level $F_b$ is acquired and the cycle of the extreme value acquisition timing at which the local minimum light level $F_s$ is acquired is one-half the natural oscillation cycle $T_F$ (S26).

When the determination result in S26 is "No," that is, when only one of the cycle of the extreme value acquisition timing at which the local maximum light level $F_b$ is acquired and the cycle of the extreme value acquisition timing at which the local minimum light level $F_s$ is acquired is one-half the natural oscillation cycle $T_F$, it means that the light level detection pattern is either of those shown in FIGS. 26 and 27.

The state in which the light level detection pattern is either of those shown in FIGS. 26 and 27 means that a peak wavelength or a bottom wavelength is present in the wavelength range under measurement corresponding to the oscillation range of the movable portion 521, as indicated by the ranges A7 and A8 shown in FIG. 19, as in FIGS. 21 and 24, and that the same light level is detected at each of the oscillation end points of the movable portion 521.

In this case, the cycle of the extreme value acquisition timing at which the local maximum light level $F_b$ corresponding to a peak wavelength is acquired (FIG. 26) and the cycle of the extreme value acquisition timing at which the local minimum light level $F_s$ corresponding to a bottom wavelength is acquired (FIG. 27) are not the natural oscillation cycle $T_F$ of the movable portion 521 or one-half the natural oscillation cycle $T_F$, and hence light levels corresponding to the oscillation end points of the movable portion 521 are not provided, for example, as in the light level detection patterns shown in FIGS. 21 and 24.

On the other hand, the local minimum light level $F_s$ detected in the light level detection pattern shown in FIG. 26 and the local maximum light levels $F_b$ detected in the light level detection pattern shown in FIG. 27 are detected in one-half the natural oscillation cycle $T_F$ and determined to be light levels corresponding to the oscillation end points of the movable portion 521. The light level detected with the movable portion 521 positioned at the oscillation center is therefore the light level detected at the time one-fourth the natural oscillation cycle $T_F$ before (or one-fourth the natural oscillation cycle $T_F$ after) the extreme value detection timings at which the extreme values are detected in one-half the natural oscillation cycle $T_F$.

When the determination result in S26 is "No," the target light level acquisition unit 24A therefore acquires, as a target light level $F_c$, a light level $F_{s1}$ (=$F_{s2}$ in light level detection pattern shown in FIG. 26) or a light level $F_{b1}$ (=$F_{b2}$ in light level detection pattern shown in FIG. 27) detected at the time one-fourth the natural oscillation cycle $T_F$ before (or one-fourth the natural oscillation cycle $T_F$ after) the extreme value acquisition timing at which the extreme value $F_b$ ($F_s$) is acquired in the natural oscillation cycle $T_F$ (S24).

When the determination result in S26 is "Yes," that is, when each of the cycle of the extreme value acquisition timing at which the local maximum light level $F_b$ is acquired and the cycle of the extreme value acquisition timing at which the local minimum light level $F_s$ is acquired is one-half the natural oscillation cycle $T_F$, the light level detection pattern corresponding to the oscillation of the movable portion 521 is either of those shown in FIGS. 22 and 25.

In this case, since it is impossible to determine which extreme value corresponds to the oscillation end points, the filter driver 21 slightly changes the drive voltage as in the process in S10 in the first embodiment, and the control returns to the process in S2. The light level detection pattern is thus changed to either of those shown in FIGS. 21 and 23, and equal extreme values acquired in the natural oscillation cycle $T_F$ are detected. A target light level $F_c$ can therefore be acquired by carrying out S23 and S24 described above.

To acquire a target light level $F_c$ corresponding to the time before the voltage is changed, the light level detection pattern before the voltage is changed may be identified after the process in S10 is carried out, and then a target light level $F_c$ corresponding to the drive voltage before it is changed may be acquired, for example, as described in the second embodiment.

For example, when equal local minimum light levels $F_s$ are acquired in the natural oscillation cycle $T_F$ after the voltage is slightly changed, the light level detection pattern before the voltage is changed is determined to be the light level detection pattern shown in FIG. 22. In this case, the local maximum light level $F_b$ before the voltage is changed is a target light level $F_c$ corresponding to the drive voltage before it is changed (corresponding to wavelength under measurement arranged at measurement intervals).

On the other hand, when equal local maximum light levels $F_b$ are acquired in the natural oscillation cycle $T_F$ after the voltage is slightly changed, the light level detection pattern before the voltage is changed is determined to be the light level detection pattern shown in FIG. 25. In this case, the local minimum light level $F_c$ before the voltage is changed is a target light level $F_c$ corresponding to the drive voltage before it is changed (corresponding to wavelength under measurement arranged at measurement intervals).

When the determination result in S25 is "No," that is, when the extreme value acquisition timing at which equal extreme values are acquired is not the natural oscillation cycle $T_F$ or one-half the natural oscillation cycle $T_F$, the light level detection pattern corresponding to the oscillation of the movable portion 521 is that shown in FIG. 29.

When the light level detection pattern is the pattern described above, it is impossible to detect which extreme value corresponds to the oscillation end points. In this case, the process in S10 is carried out, that is, the filter driver 21 slightly changes the drive voltage, and the control returns to the process in S2. The light level detection pattern is thus changed to that shown in FIG. 28, and equal extreme values are detected in the natural oscillation cycle $T_F$, whereby a target light level $F_c$ can be acquired by carrying out S23 and S24 described above.

When the target light level $F_c$ is acquired by carrying out the process in S24, the controller 20 carries out the processes in S14 and S15, as in the first embodiment.

Advantageous Effects Provided by Third Embodiment

The spectroscopic measurement apparatus 1A according to the present embodiment includes the differentiation circuit 16, which differentiates a detection signal outputted from the detector 11. The extreme value acquisition unit 26 in the controller 20A acquires extreme values (local maximum light level $F_b$ or local minimum light level $F_s$) based on the differentiation performed by the differentiation circuit 16 and detects extreme value acquisition timings at which the extreme values are acquired.

The target light level acquisition unit 24A in the present embodiment then sorts the detected extreme values into groups including equal extreme values and acquires a target light level $F_c$ based on the periodicity of the extreme value detection timing at which the equal extreme values are acquired and the natural oscillation cycle $T_F$.

That is, a light level detected in correspondence with the oscillation end points of the movable portion 521 is detected as an extreme value as long as the light level has changed within the oscillation range, as shown in FIG. 19. The positions corresponding to the oscillation end points of the movable portion 521 in a light level detection pattern can therefore be readily detected by determining the periodicity of the extreme values, whereby a light level corresponding to the oscillation center can be acquired. In the spectroscopic measurement apparatus 1A according to the present embodiment, a target light level can also therefore be quickly acquired without waiting until the oscillation of the movable portion 521 stops, and the spectral characteristic of light under measurement can be quickly measured. Since a measured light level corresponding to the oscillation center is acquired as a target light level, the measurement precision can be improved as compared with, for example, a case where the average of light levels is acquired as a target light level.

In the present embodiment, when the cycle of the extreme value acquisition timing at which equal extreme values (at least one of local maximum light level $F_b$ and local minimum light level $F_s$) are acquired is the natural oscillation cycle $T_F$, the target light level acquisition unit 24A acquires the light level at the time one-fourth the natural oscillation cycle $T_F$ before or one-fourth the natural oscillation cycle $T_F$ after the extreme value acquisition timing as a target light level $F_c$.

In this way, a target light level can be quickly acquired by using one of the light level detection patterns shown in FIGS. 20, 21, 23, 24, and 28, and a precise target light level based on a measured value can be acquired. Further, in the first embodiment described above, when a plurality of peak wavelengths and bottom wavelengths are present in a wavelength range corresponding to the oscillation range as shown in FIG. 26, an average $F_{avr}$ is calculated as a target light level $F_c$. In contrast, in the present embodiment, even when a plurality of peak wavelengths and bottom wavelengths are present, the position of an oscillation end point is known based on extreme values, whereby a target light level $F_c$ can be acquired based on a measured light level and the measurement precision can therefore be improved.

In the present embodiment, when the cycle of the extreme value acquisition timing at which one of equal local maximum light levels $F_b$ and equal local minimum light levels $F_s$ are acquired is one-half the natural oscillation cycle $T_F$, and the cycle of the extreme value acquisition timing at which the other equal extreme light levels are acquired is not the natural oscillation cycle $T_F$ or one-half the natural oscillation cycle $T_F$, the target light level acquisition unit 24A acquires, as a target light level $F_c$, the light level at the time one-fourth the natural oscillation cycle $T_F$ before or one-fourth the natural oscillation cycle $T_F$ after the extreme value acquisition timing when the extreme values are acquired in one-half the natural oscillation cycle $T_F$.

In this way, equal light levels are acquired at the oscillation end points, and a target light level can be quickly acquired at the oscillation center based on a light level detection pattern in which no peak wavelength or bottom wavelength is present, as shown in FIGS. 26 and 27. Further, a precise target light level based on a measured value can be acquired.

In the present embodiment, when each of the cycle of the extreme value acquisition timing at which equal local maximum light levels $F_b$ are acquired and the cycle of the extreme value acquisition timing at which equal local minimum light levels $F_s$ are acquired is one-half the natural oscillation cycle $T_F$, the filter driver 21 slightly changes the drive voltage applied to the electrostatic actuator 56.

That is, when the light level detection pattern is either of those shown in FIGS. 22 and 25, it is difficult to determine an extreme value corresponding to one of the oscillation end points is either a local maximum light level $F_b$ or a local minimum light level $F_s$. Even in such a case, in the present embodiment, the light level detection pattern can be changed to those shown in FIGS. 21 and 24 by slightly changing the drive voltage. A target light level $F_s$ corresponding to the oscillation center can thus be acquired by carrying out S23 and S24.

In this case, although light levels at the wavelengths under measurement corresponding to preset measurement intervals cannot be acquired, a light level detection pattern after the drive voltage is slightly changed may be used to determine light levels corresponding to the oscillation end points in the light level detection pattern before the voltage is changed, as in the second embodiment. That is, when a local minimum light level $F_s$ ($F_s'$) is acquired in the cycle of the extreme value acquisition timing that agrees with one-half the natural oscillation cycle $T_F$ in the light level detection pattern after the drive voltage is slightly changed, the target light level acquisition unit 24A acquires a local maximum light level $F_b$ in the light level detection pattern before the voltage is changed as a target light level $F_c$ corresponding to the drive voltage before it is changed. On the other hand, when a local maximum light level $F_b$ ($F_b'$) is acquired in the cycle of the extreme value acquisition timing that agrees with one-half the natural oscillation cycle $T_F$ in the light level detection pattern after the drive voltage is slightly changed, the target light level acquisition unit 24A acquires a local minimum light level $F_s$ in the light level detection pattern before the voltage is changed as a target light level $F_c$ corresponding to the drive voltage before it is changed. Light levels corresponding to the wavelengths under measurement arranged at preset measurement intervals can thus be measured.

In the present embodiment, when the extreme value acquisition timing at which equal extreme values $F_b$ (or $F_s$) are acquired does not agree with the natural oscillation cycle $T_F$ or one-half the natural oscillation cycle $T_F$, for example, in the case of the light level detection pattern shown in FIG. 29, the filter driver 21 slightly changes the drive voltage applied to the electrostatic actuator 56. The light level detection pattern can thus be changed to the pattern shown in FIG. 28, for example, whereby a target light level $F_s$ can be acquired by carrying out the process in S24.

Variations

The invention is not limited to the embodiments described above, and variations, improvement, and other modifications that achieve the advantage of the invention fall within the scope of the invention.

In each of the embodiments described above, the electrostatic actuator 56, which changes the gap value of the inter-reflection-film gap G1 by using an electrostatic attractive force induced by voltage application, is presented by way of example of the gap value changer in the wavelength tunable interference filter 5, but the gap value changer is not limited thereto.

For example, a dielectric actuator may alternatively be used in such a way that the fixed electrode 561 is replaced with a first dielectric coil and the movable electrode 562 is replaced with a second dielectric coil or a permanent magnet. Still alternatively, the electrostatic actuator 56 may be replaced with a piezoelectric actuator. In this case, for example, a lower electrode layer, a piezoelectric film, and an upper electrode layer are stacked on the holding portion 522, and the voltage applied between the lower electrode layer and the upper electrode layer is changed as an input value, whereby the piezoelectric film can be expanded and contracted to bend the holding portion 522.

In addition to the above, the specific structure used to implement the invention can be changed as appropriate to other structures to the extent that the advantage of the invention is achieved.

The entire disclosure of Japanese Patent Application No. 2011-245517, filed Nov. 9, 2011, is expressly incorporated by reference herein.

What is claimed is:

1. A spectroscopic measurement apparatus that is configured to execute processes by a processor, the spectroscopic measurement apparatus comprising:
    a wavelength tunable interference filter including
        a first substrate,
        a second substrate disposed to face the first substrate,
        a first reflection film that is provided above the first substrate, reflects part of incident light, and transmits part of the incident light,
        a second reflection film that is provided above the second substrate, reflects part of incident light, transmits part of the incident light, and is disposed to face the first reflection film with a gap interposed therebetween, and
        an actuator configured to change a gap value of the gap by applying a voltage to bend the second substrate toward the first substrate;
    a light detector configured to detect a light level of light picked up by the wavelength tunable interference filter and that outputs a detection signal reflecting the light level; and
    a measurement controller including
        a filter driver configured to drive a drive voltage to the actuator to change the gap,
        a storage configured to store a digital signal, which corresponds to the detection signal output from the light detector, for a predetermined period so that a light level detection pattern is obtained, and
        a target light level acquisition unit configured to acquire a target light level of the light that passes the wavelength tunable interference filter when the second substrate is positioned at an oscillation center based on a natural oscillation cycle of the second substrate based on timings when a maximum light level and a minimum light level are detected from the light level detection patterns, wherein the target light level acquisition unit is configured to acquire the following light levels from the light level detection patterns: the maximum light level; the minimum light level; a first light level at a point time one-fourth the natural oscillation cycle before a maximum detection timing when the maximum light level is detected; a second light level at a point of time one-fourth the natural oscillation cycle after the maximum detection timing when the maximum light level is detected; a third light level at a point of time one-fourth the natural oscillation cycle before a minimum detection timing when the minimum light level is detected; and a fourth light level at a point of time one-fourth the natural oscillation cycle after the minimum detection timing when the minimum light level is detected, and the target light level acquisition unit is configured to acquire the target light level based on a relative relationship among the first light level, the second light level, the third light level, and the fourth light level.

2. The spectroscopic measurement apparatus according to claim 1,
wherein when the first light level, the second light level, the third light level, and the fourth light level are equal to each other, the target light level acquisition unit acquires any of the light levels as the target light level.

3. The spectroscopic measurement apparatus according to claim 1,
wherein when the first light level and the second light level are equal to each other and the third light level and the fourth light level differ from each other, the target light level acquisition unit acquires the first light level and the second light level as the target light level.

4. The spectroscopic measurement apparatus according to claim 1,
wherein when the first light level and the second light level differ from each other and the third light level and the fourth light level are equal to each other, the target light level acquisition unit acquires the third light level and the fourth light level as the target light level.

5. The spectroscopic measurement apparatus according to claim 1,
wherein when the first light level and the second light level are equal to each other, the third light level and the fourth light level are equal to each other, and the first light level and the third light level differ from each other, the filter driver slightly changes the drive voltage applied to the actuator, and
after the filter driver slightly changes the drive voltage applied to the actuator, the target light level acquisition unit acquires the target light level corresponding to the drive voltage after the voltage is changed based on a first light level, a second light level, a third light level, and a fourth light level newly acquired by the storage.

6. The spectroscopic measurement apparatus according to claim 1,
wherein when the first light level and the second light level are equal to each other, the third light level and the fourth light level are equal to each other, and the first light level and the third light level differ from each other, the filter driver slightly changes the drive voltage applied to the actuator, and
after the filter driver slightly changes the drive voltage applied to the actuator, based on a first light level, a second light level, a third light level, and a fourth light level newly acquired by the storage, the target light level acquisition unit
acquires the minimum light level acquired before the filter driver slightly changes the drive voltage as the target light level corresponding to the drive voltage before the voltage is changed when the newly acquired first light level and the newly acquired second light level are equal to each other and the newly acquired third light level and the newly acquired fourth light level differ from each other, and
acquires the maximum light level acquired before the filter driver slightly changes the drive voltage as the target light level corresponding to the drive voltage before the voltage is changed when the newly acquired first light level and the newly acquired second light level differ from each other and the newly acquired third light level and the newly acquired fourth light level are equal to each other.

7. The spectroscopic measurement apparatus according to claim 1,
wherein when the first light level, the second light level, the third light level, and the fourth light level differ from one another, the target light level acquisition unit acquires an average of the light levels acquired in the period from a first timing after the filter driver applies the drive voltage to a second timing as the target light level.

8. A spectroscopic measurement apparatus that is configured to execute processes by a processor, the spectroscopic measurement apparatus comprising a wavelength tunable interference filter including
a first substrate,
a second substrate disposed to face the first substrate,
a first reflection film that is provided above the first substrate, reflects part of incident light, and transmits part of the incident light,
a second reflection film that is provided above the second substrate, reflects part of incident light, transmits part of the incident light, and is disposed to face the first reflection film with a gap interposed therebetween,
an actuator configured to change a gap value of the gap by applying a voltage to bend the second substrate, and
a target light level acquisition unit configured to acquire a target light level of the light that passes the wavelength tunable interference filter when the second substrate is positioned at an oscillation center based on a natural oscillation cycle of the second substrate based on timings when a maximum light level and a minimum light level are detected,
wherein the target light level corresponding to the oscillation center of the second substrate is acquired based on timings of the maximum light level and the minimum light level of light passing through the wavelength tunable interference filter and the natural oscillation cycle of the second substrate, and
wherein the target light level acquisition unit is configured to acquire the following light levels: the maximum light level; the minimum light level; a first light level at a point time one-fourth the natural oscillation cycle before a maximum detection timing when the maximum light level is detected; a second light level at a point of time one-fourth the natural oscillation cycle after the maximum detection timing when the maximum light level is detected; a third light level at a point of time one-fourth the natural oscillation cycle before a minimum detection timing when the minimum light level is detected; and a fourth light level at a point of time one-fourth the natural oscillation cycle after the minimum detection timing when the minimum light level is detected, and the target light level acquisition unit is configured to acquire the target light level based on a relative relationship among the first light level, the second light level, the third light level, and the fourth light level.

9. A spectroscopic measurement apparatus that is configured to execute processes by a processor, the spectroscopic measurement apparatus comprising:
   a wavelength tunable interference filter configured to pass a light having a wavelength, the wavelength being depending on a gap between a first reflection film and a second reflection film;
   a light detector configured to detect the light; and
   a measurement controller, the measurement controller including:
      a filter driver configured to apply a drive voltage to the wavelength tunable interference filter to change the wavelength by changing a position of the second reflection film, the second reflection film oscillating as a natural oscillation with a cycle of an object including the second reflection film; and
      a target light level acquisition unit configured to acquire a target light level of the light, the target light level being a light level when the second reflection film is positioned at an oscillation center of the natural oscillation, wherein
   the target level is acquired based on a first light level that is a light level at one-fourth of the cycle before a maximum detection timing that is based on a timing when a maximum light level is detected by the light detector, a second light level that is a light level at one-fourth of the cycle after the maximum detection timing, a third light level at one-fourth of the cycle before a minimum detection timing that is based on a timing when a minimum light level is detected by the light detector, and a fourth light level at one-fourth of the cycle after the minimum detection timing, wherein
   the target light level is acquired by coincidence of the first light level with the second light level and/or the third light level with the fourth light level.

* * * * *